US012293011B2

(12) United States Patent
Hadi

(10) Patent No.: US 12,293,011 B2
(45) Date of Patent: May 6, 2025

(54) METHOD AND SYSTEM FOR MANAGING VIRTUAL REALITY USER ASSESSMENT RECORDINGS

(71) Applicant: SAUDI ARABIAN OIL COMPANY, Dhahran (SA)

(72) Inventor: Syed Munib Hadi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 31 days.

(21) Appl. No.: 17/655,971

(22) Filed: Mar. 22, 2022

(65) Prior Publication Data
US 2023/0305621 A1 Sep. 28, 2023

(51) Int. Cl.
*G06F 3/01* (2006.01)
*G06Q 10/0639* (2023.01)

(52) U.S. Cl.
CPC ......... *G06F 3/011* (2013.01); *G06Q 10/0639* (2013.01)

(58) Field of Classification Search
CPC ............................ G06F 3/011; G06Q 10/0639
See application file for complete search history.

(56) References Cited

U.S. PATENT DOCUMENTS

| | | | |
|---|---|---|---|
| 7,207,804 B2 * | 4/2007 | Hersh | G09B 5/065 434/323 |
| 8,472,860 B2 | 6/2013 | Johnson et al. | |
| 9,384,675 B2 | 7/2016 | Zboray et al. | |
| 9,539,500 B2 | 1/2017 | Leyvand et al. | |
| 10,083,619 B2 | 9/2018 | Morgan et al. | |
| D831,988 S | 10/2018 | Passmore | |
| 10,388,176 B2 * | 8/2019 | Wallace | G09B 5/06 |

(Continued)

FOREIGN PATENT DOCUMENTS

| | | |
|---|---|---|
| CA | 2942852 A1 | 9/2014 |
| CA | 3059234 A1 | 10/2018 |

(Continued)

OTHER PUBLICATIONS

"The Growing Impact of Virtual Reality Training;" Jul. 15, 2021; pp. 1-5; Retrieved from the Internet: URL: https://www.shrm.org/hr-today/news/hr-magazine/spring2021/pages/virtual-reality-training-spreads-its-wings.aspx (5 pages).

(Continued)

*Primary Examiner* — Yu Chen
(74) *Attorney, Agent, or Firm* — Osha Bergman Watanabe & Burton LLP

(57) ABSTRACT

A method may include obtaining a user assessment recording of a user assessment that is performed by a user. The user assessment recording may include virtual reality (VR) image data and an avatar of the user based on image data from a camera device. The user assessment recording may be a mixed-reality recording of the user assessment. The method may further include obtaining a selection of a time step for the user assessment recording. The method may further include obtaining VR image data of the time step from the user assessment recording. The method may further include presenting a VR space of the user assessment based on the time step and the VR image data. The method may further include transmitting a command that updates one or more user records in response to presenting the VR space using a headset.

10 Claims, 18 Drawing Sheets

(56) References Cited

U.S. PATENT DOCUMENTS

| | | | |
|---|---|---|---|
| 10,403,050 | B1 | 9/2019 | Beall et al. |
| 10,438,393 | B2 | 10/2019 | Grant |
| 10,482,228 | B2 | 11/2019 | Welsh et al. |
| 10,529,248 | B2 | 1/2020 | Chavez et al. |
| 10,769,571 | B2 | 9/2020 | Anderson et al. |
| 10,839,718 | B2 | 11/2020 | Becker et al. |
| 11,042,885 | B2 | 6/2021 | Mercury et al. |
| 2014/0162224 | A1* | 6/2014 | Wallace .................. G09B 5/06 434/219 |
| 2015/0168937 | A1* | 6/2015 | Michalscheck ........ G09B 5/065 700/83 |
| 2016/0035233 | A1 | 2/2016 | Breed |
| 2016/0210503 | A1 | 7/2016 | Yin et al. |
| 2016/0275722 | A1 | 9/2016 | Bretschneider et al. |
| 2017/0018200 | A1 | 1/2017 | Nemire et al. |
| 2017/0148214 | A1* | 5/2017 | Muniz-Simas ......... A61B 5/165 |
| 2017/0162072 | A1 | 6/2017 | Horseman et al. |
| 2018/0357922 | A1* | 12/2018 | Dutta ..................... G06F 16/13 |
| 2018/0369637 | A1* | 12/2018 | Hoang ................. G09B 19/003 |
| 2019/0025906 | A1* | 1/2019 | Strong .................... G06F 3/011 |
| 2019/0380792 | A1 | 12/2019 | Poltaretskyi et al. |
| 2020/0211411 | A1* | 7/2020 | Katz .................. A63B 24/0006 |
| 2020/0388177 | A1 | 12/2020 | Recker et al. |
| 2021/0021788 | A1* | 1/2021 | Mcnelley ................ H04N 7/15 |
| 2022/0187847 | A1 | 6/2022 | Cella et al. |
| 2022/0207830 | A1* | 6/2022 | Allen ..................... G06T 19/00 |
| 2022/0262504 | A1 | 8/2022 | Bratty et al. |
| 2023/0063505 | A1* | 3/2023 | Chastain ................ G06F 3/011 |

FOREIGN PATENT DOCUMENTS

| | | |
|---|---|---|
| CN | 106471557 B | 12/2017 |
| GB | 2596733 A | 1/2022 |
| WO | 2010020867 A3 | 4/2010 |
| WO | 2013032955 A1 | 3/2013 |
| WO | 2016179652 A1 | 11/2016 |
| WO | 2018140415 A1 | 8/2018 |
| WO | 2018175551 A1 | 9/2018 |

OTHER PUBLICATIONS

Nakka, V. and Kabirdas, A; "Design and Realization of Augmented Reality Based Navigation Assistance System", International Journal of Computer Science and Information Technologies; vol. 2; No. 6; 2011; pp. 2842-2846 (5 pages).

Imran et al.; "Significance of Haptic and Virtual Reality Simulation (VRS) in the Dental Education: A Review of Literature", Applied Sciences; vol. 11; No. 21; Oct. 30, 2021; pp. 1-19 (19 pages).

Franz et al.; "Electromagnetic Tracking in Medicine—a Review of Technology, Validation and Applications", IEEE Transactions on Medical Imaging; vol. 33; No. 8; 2014; pp. 1-25 (25 pages).

Bjorn Blissing; "Tracking techniques for automotive virtual reality", VTI notat 25a-2016; 2016; pp. 1-32 (32 pages).

Silva et al.; "Introduction to Augmented Reality", National Laboratory for Scientific Computation; Jan. 2003; pp. 1-11 (11 pages).

Veronica S. Pantelidis; "Reasons to Use Virtual Reality in Education and Training Courses and a Model to Determine When to Use Virtual Reality"; Themes In Science And Technology Education; 2009; pp. 59-70 (12 pages).

Angelo M. Sabatini; "Estimating Three-Dimensional Orientation of Human Body Parts by Inertial/Magnetic Sensing", Sensors; vol. 11; Jan. 26, 2011; pp. 1489-1525 (37 pages).

Office Action Issued in Related U.S. Appl. No. 17/655,971, Mailed Apr. 9, 2024, 38 pages.

Mothukuri, U. K. et al., "Invigilated online assessment: Various ways to minimize unauthorized help," 2012 IEEE Symposium on E-Learning, E-Management and E-Services, Kuala Lumpur, Malaysia, 2012, pp. 1-4, 4 pages.

Office Action Issued in Related U.S. Appl. No. 17/655,966, Mailed Jun. 20, 2024, 24 pages.

Non-Final Office Action issued by U.S. Patent Office for corresponding U.S. Appl. No. 17/655,973, mailed Jul. 29, 2024 (21 pages).

Jerome, J. et al., "Augmented Reality + Virtual Reality: Privacy & Autonomy Considerations in Emerging Immersive Digital Worlds," Future of Privacy Forum, 2021 (40 pages).

* cited by examiner

METHOD AND SYSTEM FOR MANAGING
VIRTUAL REALITY USER ASSESSMENT
RECORDINGS

BACKGROUND

User assessments are used in numerous industries to verify whether individual workers are qualified to perform specific jobs and operations. In particular, user assessments may be used to measure a worker's ability to follow safety protocols as well as aptitude for performing work-related tasks. However, many user assessments require a skilled instructor to oversee the user assessment. Furthermore, a simple computer examination may not accurately identify whether a worker possesses the necessary skills to perform jobs in complex and dangerous environments, such as manufacturing plants, chemical refineries, and well sites.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes determining, by a user device, various tasks associated with a user assessment. The method further includes generating, by the user device, a virtual reality (VR) space for the user assessment based on the tasks. The method further includes transmitting, by the user device during the user assessment, VR image data to a headset coupled to the user device, wherein the VR image data corresponds to the VR space. The method further includes generating, by the user device, a user assessment recording in response to a user performing tasks in the VR space. The user assessment recording is based on the VR image data and an avatar of the user based on image data from a camera device coupled to the user device. The user assessment recording is a mixed-reality recording of the user assessment.

In general, in one aspect, embodiments relate to a user device that includes a touch controller, a headset, a tracking sensor, a display device, a camera device, and a user assessment manager that includes a computer processor and memory. The user assessment manager is coupled to the touch controller, the headset, the tracking sensor, the display device, and the camera device. The user assessment manager determines various tasks associated with a user assessment. The user assessment manager further generates a virtual reality (VR) space for the user assessment based on the tasks. The user assessment manager further transmits, to the headset, VR image data corresponding to the VR space. The user assessment manager generates, in response to a user performing the tasks, a user assessment recording. The user assessment recording is based on the VR image data and an avatar of the user based on image data from the camera device.

In general, in one aspect, embodiments relate to a server that includes a computer processor and a memory coupled to the computer processor. The memory includes instructions that obtain, from a first user device, a request to access a VR space that is performing a user assessment. The memory further includes instructions that establish, in response to the request, a network connection between a first user device and a second user device. The second user device hosts the VR space. The memory further includes instructions that transmit, to the first user device, VR image data including a first avatar and second avatar in the VR space. The first avatar corresponds to a user performing the user assessment, and the second avatar corresponds to an evaluator of the user assessment.

In general, in one aspect, embodiments relate to a system that includes a user device including a touch controller, a headset, a tracking sensor, a camera device, and a user assessment manager that includes a computer processor. The system further includes a server coupled to the user device. The user assessment manager determines various tasks associated with a user assessment. The user assessment manager generates a virtual reality (VR) space for the user assessment based on the tasks. The user assessment manager transmits VR image data corresponding to the VR space. The user assessment manager generates, in response to a user performing the tasks, a user assessment recording. The user assessment recording includes the VR image data and a avatar of the user based on image data from the camera device.

In general, in one aspect, embodiments relate to a method that includes obtaining assessment data for a user assessment that is performed by a user. The method further includes determining, by a computer processor and based on the assessment data, a task associated with the user assessment. The method further includes generating, by the computer processor and based on the assessment data, a virtual reality (VR) space that includes a virtual plant facility for performing the task and a VR plant component in the VR space. The task is performed using the VR plant component. The method further includes presenting, by the computer processor and to the user using a headset, VR image data corresponding to the task in the VR space. The method further includes obtaining, by the computer processor and from a headset, a user input in response to presenting the task in the VR space. The method further includes determining, by the computer processor, whether the user satisfied the user assessment based on the user input.

In general, in one aspect, embodiments relate to a method that includes obtaining a user assessment recording of a user assessment that is performed by a user. The user assessment recording includes virtual reality (VR) image data and an avatar of the user based on image data from a camera device. The user assessment recording is a mixed-reality recording of the user assessment. The method further includes obtaining a selection of a time step for the user assessment recording. The method further includes obtaining VR image data of the time step from the user assessment recording. The method further includes presenting, by a computer processor, a VR space of the user assessment based on the time step and the VR image data. The method further includes transmitting, by the computer processor, a command that updates one or more user records in response to presenting the VR space using a headset.

In general, in one aspect, embodiments relate to a system that includes a user device including a computer processor and a headset. The system further includes a server coupled to the user device. The user device obtains, from the server, a user assessment recording of a user assessment that is performed by a user. The user assessment recording includes virtual reality (VR) image data and an avatar of the user based on image data from a camera device. The user assessment recording is a mixed-reality recording of the user assessment. The user device obtains a selection of a time step for the user assessment recording. The user device obtains VR image data of the time step from the user assessment recording. The user device presents, using the headset, a VR space of the user assessment based on the time step and the VR image data. The user device transmits a command that updates one or more user records in response to presenting the VR space.

In general, in one aspect, embodiments relate to a method that includes obtaining, from a user device, a request for a user to perform a user assessment. The method further includes obtaining, from a camera device coupled to the user device, first image data regarding the user. The method further includes obtaining second image data regarding a user credential of the user. The method further includes determining, automatically by the user device, whether the user is authorized to perform the user assessment based on an analysis of the first image data and the second image data. The method further includes generating, by the user device and in response to determining that the user is authorized to perform the user assessment, a virtual reality (VR) space based on the user assessment.

In general, in one aspect, embodiments relate to a system that includes a user device including a touch controller, a headset, a tracking sensor, a camera device, and a user assessment manager that includes a computer processor. The system further includes a server coupled to the user device. The user device obtains, from the server, user registration data associated with a user assessment. The user device obtains, from the camera device, first image data regarding the user. The user device obtains second image data regarding a user credential of the user. The user device determines whether the user is authorized to perform the user assessment based on an analysis of the first image data, the second image data, and the user registration data. The user device generates, automatically in response to determining that the user is authorized to perform the first user assessment, a virtual reality (VR) space based on the first user assessment.

In some embodiments, one or more user inputs are obtained from a touch controller coupled to a user device in response to performing one or more tasks among the tasks in the VR space. The user device may determine whether the user satisfied the user assessment based on the one or more user inputs. In some embodiments, a command is transmitted to a server that updates one or more user records in response to determining that a user satisfied the user assessment. In some embodiments, a request to access a VR space is obtained by a user device and from a different user device. In response to obtaining the request to access the VR space, an evaluator avatar in the VR space may be generated. The evaluator avatar may provide assessment feedback to the user in real time within the VR space. In some embodiments, VR image data are presented to a display device coupled to a user device. The VR image data may present a third-person viewpoint of an avatar in the VR space. In some embodiments, VR image data present a first-person viewpoint of a VR space to a user. In some embodiments, image data of a user are obtained from the camera device of the user performing a second user assessment. A user device may determine, using an artificial intelligence (AI) model, whether a user that is performing the second user assessment is an authorized user that used a user credential to initiate a VR session for a user assessment. In some embodiments, the AI model is a deep neural network including an input layer, various hidden layers, and an output layer. The input layer may obtain as inputs an image in the user credential and image data of a user that is obtained by the camera device prior to initiating the VR session. The deep neural network may predict whether the second user is the same as the authorized user at the output layer. In some embodiments, biometric data are obtained from a user. User registration data may be obtained that is associated with a user assessment. Whether the user is authorized to perform the user assessment may be determined based on the biometric data and the user registration data. A VR space may be generated in response to determining that the user is authorized to perform the user assessment. In some embodiments, a VR space is a virtual reality environment corresponding to a plant facility. The VR space includes various VR plant components that are affected by a VR environmental factor. The VR plant components correspond to various plant devices and the VR environmental factor corresponds to a predetermined amount of wind in the VR space at a predetermined wind direction and wind speed. In some embodiments, a user assessment is selected from a group consisting of a plant inspector certification, a supervisor certification, an electric hazard recognition assessment, and a scaffolding certification. In some embodiments, a user device is a kiosk including a first pod and a second pod. A first user assessment may be performed at the first pod simultaneously with a second user assessment that is performed at the second pod. The first user assessment may correspond to a plant certification that is different from the second user assessment.

In some embodiments, a user device includes various pods including a first pod and a second pod. The first pod may include a first touch controller, a first headset, a first tracking sensor, a first display device, and a first camera device. The second pod may include a second touch controller, a second headset, a second tracking sensor, a second display device, and a second camera device. A user assessment manager may perform various user assessments simultaneously using the pods. In some embodiments, a user device includes a printing device coupled to a user assessment manager. The printing device may produce a printed hardcopy of assessment feedback based on a user assessment. In some embodiments, a user device includes a second camera device coupled to a user assessment manager. VR image data for a first camera device may corresponds to a first viewpoint, where a user assessment recording includes VR image data for a second viewpoint that corresponds to the second camera device. The user assessment recording may switch between the first viewpoint and the second viewpoint in response to a user selection. In some embodiments, image data are obtained regarding a user from a camera device. Image data may be obtained regarding a user credential of the user. A user device may determine whether the user is authorized to perform the user assessment automatically based on an analysis of the image data. A VR space may be generated in response to determining that the user is authorized to perform the user assessment. In some embodiments, image data regarding a first user are obtained from a camera device. Image data of a second user are obtained performing a user assessment in a VR space. A user device may determine whether the first user and the second user are the same user based on an analysis of the image data of the first user and the second user. The user device may terminate, in response to determining that the first user and the second user are different users, the VR space for the user assessment. In some embodiments, a user device includes a microphone device coupled to a user assessment manager. The user assessment manager may obtain, from the microphone device, sound data of a user performing a user assessment. The user assessment manager may determine whether the user is receiving assistance from an external source based on an analysis of the sound data. The user assessment manager may terminate, in response to determining that the user is receiving the assistance from the external source, a VR space for the user assessment.

In some embodiments, a system includes a user device coupled to a server, where the user device transmits a request to the server to access a VR space in real time during a user performing a user assessment. In response to the server accepting the request, another user device may generate an avatar in the VR space corresponding to the requesting user device. In some embodiments, a user device includes a touch controller, a tracking sensor, and a headset, where a user assessment manager transmits VR image data corresponding to a VR space to the user device. The second user device may control an avatar using the touch controller or the headset. In some embodiments, a system includes a user device coupled to a server, where the user device includes a display device that presents a VR space. The user device may transmit assessment feedback to a user within the VR space in real time while the user is performing a user assessment in response to presenting the VR space. In some embodiments, a server provides a graphical user interface for accessing various user assessment recordings. A user device may upload a user assessment recording to the server after a user assessment is completed. In some embodiments, a touch controller includes an electromagnetic receiver. A tracking sensor may include a transmitter that transmits an electromagnetic sensing signal to the touch controller. A user device may determine position data regarding a user during a user assessment using the electromagnetic receiver and the electromagnetic transmitter. In some embodiments, a tracking sensor is a base station that uses a predetermined position detection technique, and where the predetermined position detection technique is selected from a group consisting of electromagnetic sensing, optical tracking, and video tracking.

In some embodiments, a command is transmitted to a server that updates one or more user records in response to determining that a user satisfied a user assessment. In some embodiments, a VR environmental factor may be generated in a VR space, where a task includes a detection by a user of the VR environmental factor prior to contacting a VR plant component. Whether the user detects the VR environmental factor may be determined based on analyzing an eye gaze of an avatar corresponding to the user. In some embodiments, an eye gaze of an avatar is determined using a machine-learning model. In some embodiments, a request to access a VR space for a user assessment is obtained from a user device and using a server. In response to the request, a network connection may be established between the requesting user device and another user device, where the other user device hosts the VR space. A first avatar and second avatar may be generated in the first VR space, wherein first avatar corresponds to the user performing the user assessment, and the second avatar corresponds to an evaluator of the user assessment. In some embodiments, VR image data are presented to a display device, wherein the VR image data present a third-person viewpoint of an avatar performing a task in a VR space. A user device may transmit assessment feedback over a network in response to presenting the VR image data, where the assessment feedback determines a user's score of the user assessment. In some embodiments, a user assessment is a dynamic assessment that includes various tasks including a first task and a second task. The first task may be a static task that corresponds to a predetermined right action and a predetermined wrong action for scoring the user assessment. the second task may be a branching task that is scored by a user device based on various scenarios. In some embodiments, an evaluator device transmits a command to a user device that is operating a VR space, where the command adjusts the VR space to produce an adjusted VR space. The adjusted VR space may include a VR plant component that is different from another VR plant component and not located in the original VR space. In some embodiments, VR image data corresponding to a task in a user assessment are presented to an evaluator device. The evaluator device may transmit a command to a user device that is operating the VR space, where the command may adjust the task to produce an adjusted task. the adjusted task may correspond to a user input that is different from another user input for the task. In some embodiments, a user device may obtain a request to perform a user assessment among various user assessments. The user device may obtain assessment data that corresponds to the requested user assessment. The user device may generate a VR space for the user assessment based on the assessment data, where assessment data are stored on the user device. Different user assessment data may be used for different types of user assessments.

In some embodiments, a task is determined for a user assessment associated with a time step in a user assessment recording. VR plant component data and VR environmental factor data may be obtained regarding the task. A VR space may be presented with the VR plant component data and the VR environmental factor data overlaying one or more VR plant components disposed in the VR space. In some embodiments, a first viewpoint among various viewpoints of a VR space is determined at the first time step. The VR space may be presented using a headset in the first viewpoint. A user device may obtain a selection of a second viewpoint among the viewpoints. Using the headset, a second VR space of the first user assessment may be presented based on the first time step and the second viewpoint. The second viewpoint may correspond to a second camera device that is different from the first camera device for the first viewpoint. In some embodiments, a selection of a second time step for a user assessment recording may be obtained. A VR space of the user assessment may be obtained based on the second time step. The second time step may be different from the first time step. In some embodiments, a task is determined for a user assessment associated with a time step. Assessment feedback may be obtained for the task. The assessment feedback may correspond to one or more messages from an evaluator device in response to a real time performance of the user assessment. The assessment feedback may be updated to produce updated assessment feedback in response to presenting the VR space to the evaluator device based on the user assessment recording. In some embodiments, using a user interface coupled to a server, various user assessment recordings may be presented on a user device. A selection of a user assessment recording among various user assessment recordings may be obtained from a user device. A VR space may be generated based on the selected user assessment recording.

In some embodiments, image data are obtained of a user performing a user assessment. Whether the user in the image data and another user are the same user may be determined based on an analysis of the image data. In response to determining that the two users are different users, a VR space may be terminated for a user assessment. Two users may be determined to be different users using an artificial intelligence (AI) model, wherein the AI model is a deep neural network that includes an input layer, various hidden layers, and an output layer, and wherein the input layer obtains as inputs the first image data, the second image data, and the third image data. In some embodiments, image data are acquired at a predetermined interval, where determining whether two users are the same user is performed at the predetermined interval. In some embodiments, image data of a user performing a user assessment is obtained from a camera device. Whether the user is receiving assistance from an external source may be determined based on an analysis of the image data. In response to determining that the user is receiving the assistance from the external source, a VR space for the user assessment may be terminated. In some embodiments, eye gaze data of a user are determined during a task in a user assessment. Whether the user is receiving assistance from an external source may be determined based on an analysis of the eye gaze data. In response to determining that the user is receiving the assistance from the external source, a VR space for the user assessment may be terminated. In some embodiments, an external source is a handheld computer device that is separate from a user device performing a user assessment in a VR space. In some embodiments, sound data of a user performing a user assessment are obtained from a microphone device coupled to a user device. Whether the user is receiving assistance from an external source may be determined based on an analysis of the sound data. In response to determining that the user is receiving the assistance from the external source, a VR space for the user assessment may be terminated. In some embodiments, image data of a user performing a user assessment may be obtained by a user device. Whether an initial user and the user in the image data are the same user may be determined based on an analysis of the image data. In response to determining that the first user and the second user are different users, a VR space for the user assessment may be terminated.

In some embodiments, a first user and a second user are determined to be different users using an artificial intelligence (AI) model. The AI model may be a deep neural network that includes an input layer, various hidden layers, and an output layer. The input layer may obtain as inputs image data and user registration data.

In light of the structure and functions described above, embodiments of the invention may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
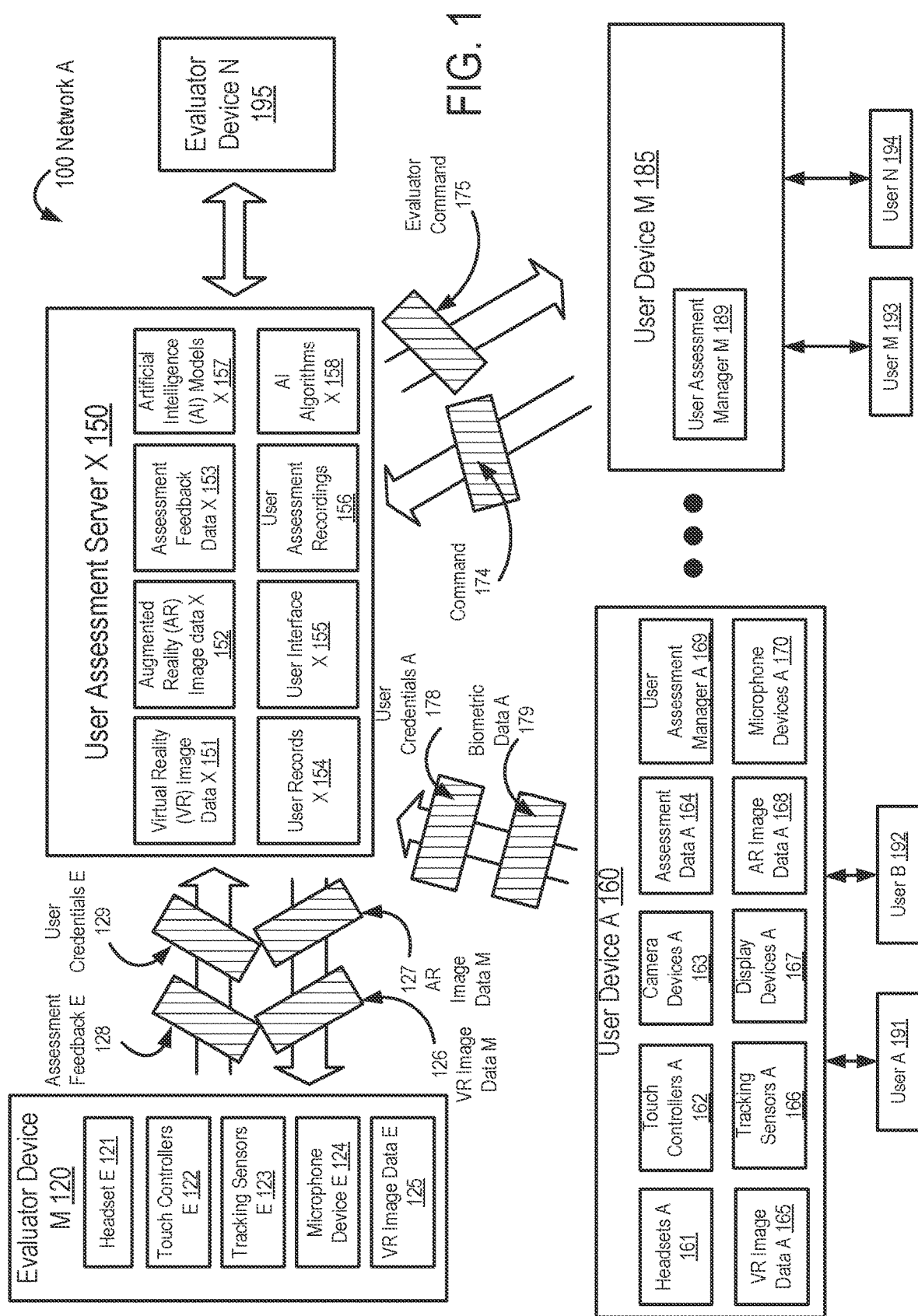
FIGS. 1, 2A, 2B, 3, and 4 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using a user assessment manager to provide user assessments in virtual reality (VR). In particular, some embodiments may provide an automated solution that enables a user to perform a user assessment within a VR simulation with no or minimal human involvement. This VR simulation may occur in a VR space with virtual components in a virtual environment that may resemble actual working conditions. In addition to the user assessment, an automated system may ensure authentication of the user participating in the assessment as well as implementation of various anti-cheating mechanisms. For example, an anti-cheating mechanism may detect whether a user is receiving outside assistance from external sources (e.g., from a human aid or a handheld computer device) or a different person is performing a test. In some embodiments, biometric information (e.g., fingerprint scanning, voice recognition, etc.) and periodic photographing of users are used to confirm that a registered user is the actual user performing tasks throughout the actual examination. Likewise, user assessments may be recorded through a mixed-reality capture. Such user assessments recordings may be used for post-assessment auditing and performance reviews of either the test taker or even the evaluator. Thus, the automated process may be completely auditable and transparent for later analysis.

Furthermore, this automated process may assist in various industrial certifications and other assessment types that previously required a formal proctor to administer the examination. Where proctors were previously needed at the same site as the test takers, virtual reality user assessments may certify competence and safe operation by a large number of industrial workforces without having onsite proctors. Because user assessments may include a wide range of different subjects, it could be cumbersome for users to visit many different assessment facilities to be certified in all necessary subjects for a particular job. By streamlining the assessment process, various physical assets and onsite personnel may be reduced or eliminated altogether from the actual assessments using a substitute virtual reality environment.

Likewise, a VR-based cloud solution may require significant bandwidth and not be available in remote locations that lack significant Internet access. Thus, streaming a full virtual reality assessment may not work for many end users. By providing an assessment using local user devices (e.g., a kiosk with multiple pods that provides the VR space without streaming), some embodiments may enhance the user experience while reducing latency and quality in the VR experience. In some embodiments, the system provides user assessment results after completion of an assessment, such as through sending grades to a central server or by directly updating user records with commands over a network. Additionally, user authentication may be accomplished through user accounts registered prior to a user assessment, various user identification protocols (e.g., multi-factor verification), and/or matching user credentials to actual test takers. For example, users may simply arrive at a kiosk and provide their registration data for a scheduled exam. Next, a user may identify themselves as test takers and provide their user credentials. After analyzing biometric data and authenticating an authorized user, the system may simply allow the user to begin a VR session for taking their particular performance-based test.

In some embodiments, user assessments are integrated in a VR reality space with one or more artificial intelligence (AI) features. Through AI, human bias may be removed from an assessment through automation implemented by a user device. Throughout a user assessment, for example, software may track a user's performance in a given task through monitoring a user's eye gaze and other movements within the virtual reality environment. Software may also record user inputs provided to VR equipment for easier post-assessment review. Thus, the level of user monitoring in a VR space may surpass the practical abilities of a human proctor or the data acquired from an oral or written examination. Likewise, one or more AI features may be provided to human evaluators accessing the virtual world. For example, a remote user may login into a user device operating a user assessment in a VR space. Once logged into the VR space, the remote user may communicate directly with a test taker, record assessment feedback based on the test taker's actions, or even adjust the user assessment within the virtual world (e.g., by adding or removing VR components and environmental factors relating to tasks performed by a given test taker). AI features may be implemented through various rule-based technologies, as well as various machine-learning models and machine-learning algorithms.

Turning to FIG. 1, FIG. 1 shows a schematic diagram in accordance with one or more embodiments. As shown in FIG. 1, a network (e.g., network A (100)) may include various user devices (e.g., user device A (160), user device M (170), evaluator device M (120), evaluator device N (195)), various network elements (not shown), such as routers and switches, one or more servers (e.g., user assessment server X (150)) and/or one or more user assessment managers (e.g., user assessment manager A (169), user assessment manager M (189)). In some embodiments, the system shown in FIG. 1 may perform one or more user assessments in a virtual reality (VR) space. The VR space may be generated using VR image data, where a user may perform tasks in the VR space. User devices may include or be coupled to various VR devices, such as one or more headsets (e.g., headset E (121), headsets A (161)), one or more touch controllers (e.g., touch controller E (122), touch controllers A (162)), one or more camera devices (e.g., camera devices A (163)), one or more tracking sensors (e.g., tracking sensors E (123), tracking sensors A (166)), one or more microphone devices (e.g., microphone device E (124), microphone devices A (170)), and one or more display devices (e.g., display devices A (167)). For example, a user device may be used to perform one or more tasks associated with a respective user assessment. User devices may include personal computers, handheld computer devices such as a smartphone or personal digital assistant, wireless devices (e.g., a wireless standalone VR headset), kiosks, or a human machine interface (HMI). As such, user devices may include hardware and/or software with functionality to obtain one or more user inputs from various users (e.g., user A (191), user B (192), user M (193), user N (194)). Touch controllers may include hand controllers with functionality for interacting with a VR system using tracking sensors, VR pointing devices, and other controllers that use VR technology. However, touch controllers may also include other input devices, such as joysticks, computer mouses, remote controls, and video game controllers that may not necessarily be specific to VR environments.

Examples of user assessments may include safety and quality certifications, such as plant inspector certifications, supervisor certification, well control certifications, scaffolding certifications, electric hazard assessments, plant operation assessments, and driller certifications. For illustration, a user assessment may include a user flushing a level column and level gauge. However, other types of user assessments are also contemplated such as examinations for laboratory technicians, medical equipment technicians, information technology certifications, certifications for non-plant personnel, etc. Moreover, a user assessment server, a user assessment manager, user devices, and network elements may also include computer systems similar to the computer system (1102) described in FIG. 11 and the accompanying description.

In some embodiments, virtual reality (VR) technology is used to generate VR image data (e.g., VR image data E (125), VR image data M (126), VR image data X (151), VR image data A (165)) for one or more user assessments. Virtual reality may refer to the use of computer technology to produce a simulated environment. For example, virtual reality may produce a virtual reality space that simulates multiple human senses, such as vision, hearing, touch, and/or smell, where a user device may operate as a gatekeeper to this simulated environment. Virtual reality images and VR video may be produced using various VR camera devices, such as 360-degree cameras, omnidirectional cameras or camera arrays. For example, a VR camera device may acquire multiple images, such as 3D images, from different angles simultaneously. As such, multiple images may be connected or stitched together to produce a spherical image or 3D images viewed with a headset. Headsets for virtual reality may include a head mounted display device that is wearable by a user and may result in complete immersion in a VR space. In particular, a VR headset may include two individual display devices for a user's eyes, thereby providing stereoscopic views within the VR space. Headset examples may include opaque headsets for pure virtual reality or optical see-through headsets and video see-through headsets for mixed reality.

Keeping with virtual reality, a user may move through the physical world in six degrees of freedom (DOF). More specifically, six DOF may correspond to linear translatory motions in three axes (i.e., the x-axis, the y-axis, and a z-axis) and various rotational motions around these axes. Thus, linear translatory motions may be described as sway (x), surge(y) and heave(z), while rotational motions may be identified as pitch($\theta$), roll($\varphi$) and yaw($\psi$). As such, a motion tracking system that determines only rotations may be a 3-DOF system, while a motion tracking system which that determines only linear translations may also be a 3-DOF system. Likewise, a motion tracking system that determines linear translations and orientations may be a 6-DOF system. Motion tracking systems with more than six degrees of freedom may refer to motion tracking of multiple features simultaneously (e.g., linear translations and rotations for a user's head, individual legs, individual arms, torso, etc.). For example, 9-DOF motion tracking system may include a 6-DOF motion tracker for a user's hand and a 3-DOF system at the user's elbow. Another motion tracking system may use different tracking technologies with different tracking volumes or accuracy. A 9-DOF motion tracking system may also include a 6-DOF tracker for small scale tracking and a 3-DOF tracker for large scale tracking.

Turning to motion tracking technologies, a tracking sensor may use electromagnetic tracking, mechanical tracking, inertial tracking, optical tracking, and/or video tracking. In particular, electromagnetic tracking may use a transmitter to generate one or more electromagnetic sensing signals that are detected by one or more receivers. For example, an electromagnetic tracking system may include one or more base stations that include transmitters for emitting magnetic fields, e.g., alternating between three orthogonal axes. A tracked object may include a touch controller or a headset that includes one or more receivers which can measure this generated sensing field. This electromagnetic sensing may be used to determine both position and orientation data of the tracked objects. Using positional information of the transmitter, an absolute position of one or more receivers may be determined. Electromagnetic systems may have no line of sight restrictions, allowing users to move about in a physical space that might have multiple non-metallic obstacles between the users and the transmitters.

Turning to mechanical trackers, a mechanical tracker may include multiple rods and rotary encoders that are connected to a tracked object. By measuring the angles of the rods, the position of the tracked object may be determined via forward kinematics. With inertial trackers, an inertial tracker may operate by measuring angular velocities (e.g., using a gyroscope) and linear accelerations (e.g., using an accelerometer). Inertial trackers may be relative in their nature, i.e., inertial sensing technology may determine orientation and position relative one or more initial starting conditions. With optical tracking technology, optical trackers may operate by projecting predetermined light patterns over a desired tracking volume. A tracked object may include one or more optical sensors that can detect changes in the light pattern. Thus, position information may be determined using knowledge of the light pattern and the information from one or more light sensors.

Turning to video trackers, a video tracker may employ cameras and image processing to detect position data and orientation data regarding various objects. For example, one or more camera devices may be disposed on the tracked object looking at fixed objects in a predetermined environmental space. Video tracking may also be called inside-out tracking. Likewise, a camera device may be fixed and looking at the tracked object, which may be referred to as outside-in tracking. Moreover, camera devices may monitor special markers, known as fiducial markers, which may be objects or special patterns which are easily detected by the camera and uniquely identifiable. An example of a video tracker may include RGB-D camera-based tracking sensor, which may provide a contactless technique for body tracking without wearing any tracked objects. In some embodiments, tracking technology is implemented using a hybrid solution based on two or more tracking technologies. A hybrid tracking mechanism may remedy the drawbacks of one technology by using a complementary technology.

Furthermore, some embodiments use augmented reality (AR) technologies to generate AR image data (e.g., AR image data M (127), AR image data X (152), AR image data A (168)) for one or more user assessments. In particular, a user device may include sensors and algorithms to determine position and orientation of one or more camera devices for producing AR image data. Accordingly, AR technology may render the 3D graphics as they would appear from the viewpoint of a camera device. For example, a user device may superimpose computer-generated images over a user's viewpoint of the real world. Thus, the user device may include a scene generator that is hardware and/or software with functionality for rendering an AR scene in a particular VR space. In some embodiments, for example, a user operating a user device is rendered in an AR scene that is viewed by one or more evaluator devices (e.g., evaluator device M (120), evaluator device N (185)). AR technology may thereby align real objects with VR components in a virtual reality space. Similar to VR systems, AR systems may include headsets (e.g., headset E (121), headsets A (161)), such as a head mounted display (HMD), an optical see-through device, virtual retinal device (VRD), or a video see-through device. However, other devices for displaying AR images are also contemplated, such as monitor-based devices and projector-based devices. An optical see-through device may use a transparent head mounted display to show a VR space directly over real world components or physical structures. A virtual retinal device (VRD) may project a modulated beam of light directly onto the retina of a user's eye thereby producing a rasterized image. A video see-through device may use an opaque headset to display a merged video of a VR space and one or more views from camera devices on the opaque headset. A monitor-based device may use merged video streams on a desktop monitor or a handheld display device. In some embodiments, additional trackers may be used with various kinematic algorithms to determine positional information relating to a user's arms or legs.

In some embodiments, a network (e.g., network A (100)) includes one or more user assessment managers (e.g., user assessment manager A (169), user assessment manager M (189)) that includes hardware and/or software with functionality for managing one or more user assessments at one or more user devices (e.g., user device A (160), user device M (170)) on the network. More specifically, the user assessment manager may include functionality for authenticating users at user devices and evaluator devices (e.g., evaluator device M (120), evaluator device N (185)) and/or managing user assessment operations in one or more virtual reality spaces. For example, a user may provide one or more user credentials (e.g., user credentials A (168), user credentials E (129)) to confirm their identity. A server coupled to the user device or a user assessment manager may verify whether the user credentials are accurate and correspond to a registered user for a particular examination. If user credentials match user registration data, a server may transmit a network message over a network connection to a user assessment manager confirming the user's identity. The network message may also identify one or more user assessment parameters (e.g., time duration, type of user assessment, etc.) of a virtual reality session for the respective user, e.g., based on user registration data.

Keeping with user authentication, user credentials may include passwords, user identifications that include user photos, user codes (e.g., based on a multi-factor authentication protocol), key cards, proximity cards, and/or other user accessories for identifying a particular user. A user code may be a single use password or a security token, which may expire after a predetermined amount of time. For example, the user code may be a time-based one-time password (TOTP) that a user is required to manually enter at a user device. Furthermore, the user assessment server may also include functionality for obtaining and/or analyzing biometric data (e.g., biometric data A (169)) to authenticate one or more users. Examples of biometric data may include fingerprint data (e.g., from a fingerprint scanner or touch sensing device), hand scan data, facial image data, iris scan data, ear scan data, signature recognition data, vein scan data, voice data, and other biometric data types for identifying users. For illustration, a user may provide both a username, a user password, and a facial scan using a camera device (e.g., one of the camera devices A (163)) coupled to a user device in order to obtain access to a particular user assessment.

Once a user is authenticated, for example, the user assessment manager may enable evaluator devices to connect to the user device over one or more network connections. Likewise, the user assessment manager may include functionality for managing automatically one or more tasks within a virtual reality space for assessing users. As such, the user assessment manager may use assessment data (e.g., assessment data A (164)) to determine a particular type of user assessment, one or more tasks to be performed during the user assessment, settings of the virtual reality space during the user assessment, and any adjustments to virtual reality components or other user assessment attributes during performance of the user assessment. For example, a user assessment manager may adjust the virtual reality space in response to user inputs or assessment feedback (e.g., assessment feedback E (128) from an evaluator device M (120)) based on an evaluator monitoring a test taker in real time.

In some embodiments, a user assessment manager obtains assessment feedback during user assessment. The assessment feedback may be generated automatically in response to software monitoring an assessment. Likewise, the assessment feedback may also be user feedback provided by one or more observers watching the user assessment in real-time or through a user assessment recording (e.g., user assessment recordings (156)) following the actual performance. In some embodiments, assessment feedback is stored on one or more servers (e.g., assessment feedback data X (153)). The assessment feedback may describe scoring metrics relating to one or more tasks, comments relating to a user's success or failure with a given task, such as recommendations for improving performance, and any other feedback. The assessment feedback may be presented directly to a user within a VR space (e.g., as audio feedback or text printed on one or more VR components in the VR space), on a display device coupled to a user device providing the user assessment, or a physical hardcopy that is printed by a printing device. In some embodiments, a server provides one or more user interfaces (e.g., user interface X (155)) to provide access to assessment feedback and/or user assessment recordings for previous user assessments.

In some embodiments, a user assessment manager updates one or more user records (e.g., user records X (154)) following completion of a user assessment. In particular, a user assessment manager may transmit one or more commands (e.g., command (174)) to one or more servers (e.g., user assessment server X (150)) based on a user passing or failing a particular assessment. In some embodiments, other user devices or servers may transmit one or more commands to a user assessment manager (e.g., evaluator command (175)) to adjust VR spaces, tasks, and other parameters relating to user assessments. For example, an evaluator observing a user assessment in real time within a VR space may modify VR components and tasks in the VR space based on user inputs or user feedback. Likewise, a user assessment manager may upload one or more user assessment recordings (e.g., user assessment recordings (156)) to a hosting site, such as a server or cloud storage device, following the actual user assessment. As such, a remote user may log into a server to audit or review past user assessment recordings.

In some embodiments, a user submits an assessment request to a user device or a server coupled to the user device. For example, a request may be network message that causes a VR session to initiate for a user assessment. Additionally, the request may initiate an authentication protocol that verifies the identity of the user requesting the user assessment, e.g., using biometric data, user credentials, and/or user registration data. Likewise, other requests are also contemplated, such as requests to play user assessment recordings, requests to update user records, requests to access VR spaces, and other requests that update data on user devices and servers.

Figure 2A:
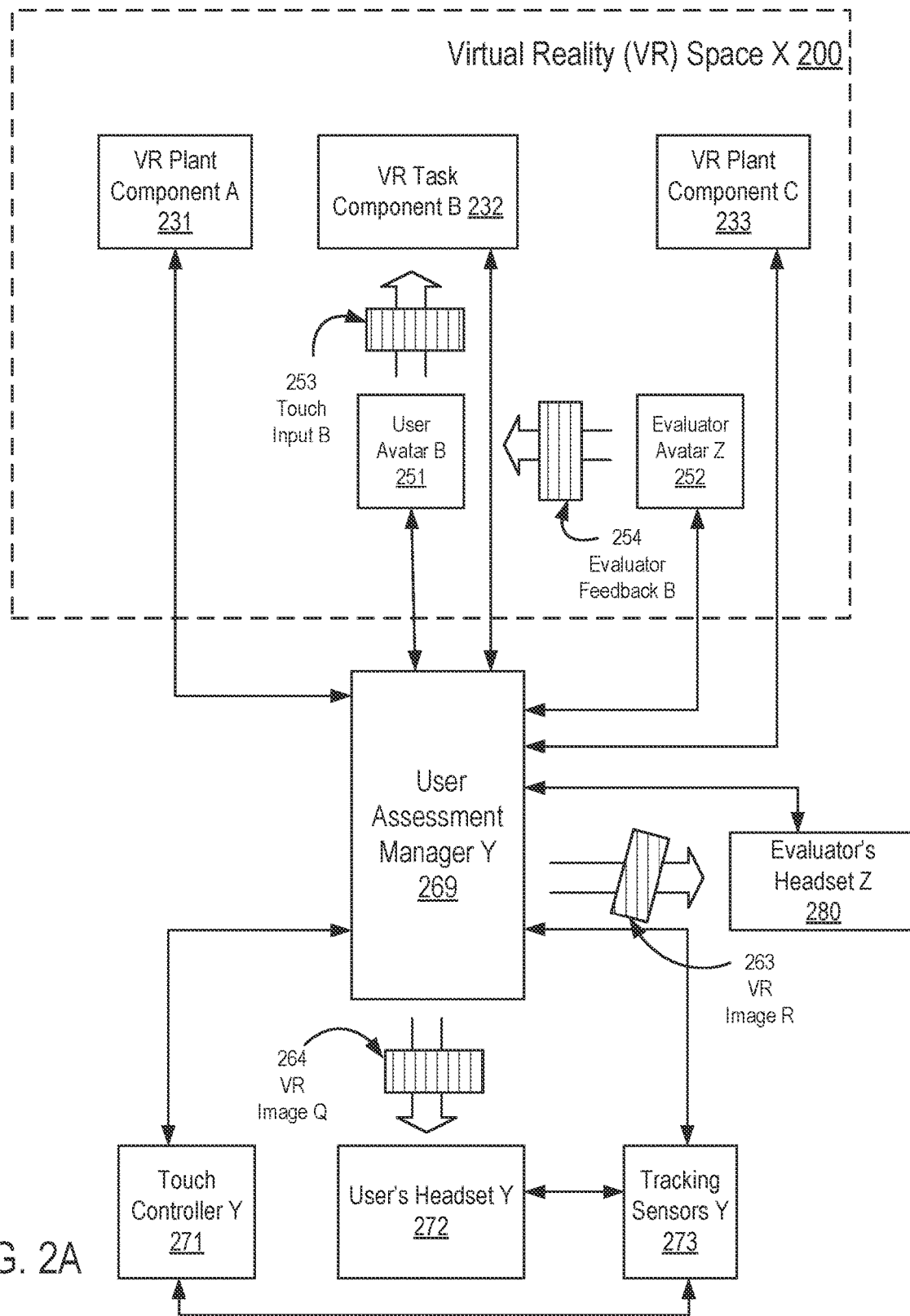
Figure 2B:
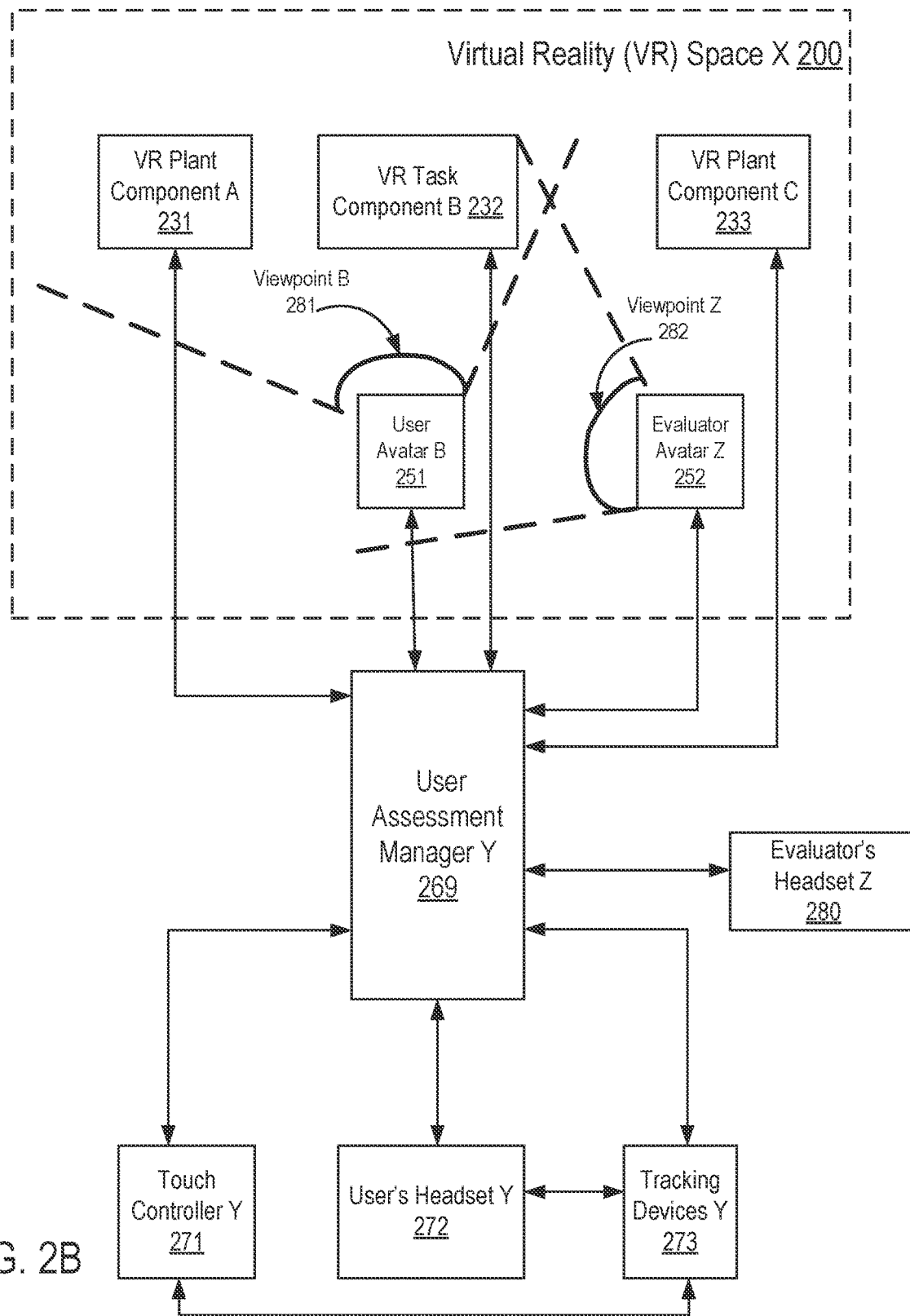

Turning to FIGS. 2A and 2B, FIGS. 2A and 2B show schematic diagrams in accordance with one or more embodiments. As shown in FIG. 2A, a user assessment manager (e.g., user assessment manager Y (269)) may generate one or more virtual reality (VR) spaces (e.g., VR space X (200)) that include various VR components (e.g., VR plant component A (231), VR task component B (232), VR plant component C (233)). For example, a VR plant component may be VR representation of plant equipment, structures, or an obstacle at a plant facility in a VR environment. Likewise, a VR task component may be a VR plant component that a user interacts with, e.g., using a touch controller or other VR input device as part of one or more tasks. For illustration, a VR plant component may be VR crude oil distillation unit at a particular VR space emulating a refinery, while the VR task component may be a valve or switch coupled to VR crude oil distillation unit. In some embodiments, for example, a VR component is generated with one or more predetermined VR environmental factors. Examples of VR environmental factors may include various states or conditions in the VR space, such as being wet, dirty, dusty, windy, emitting steam or other visible gases, etc. In some embodiments, for example, a VR environmental factor corresponds to a predetermined amount of wind at a predetermined wind direction in a VR space.

In some embodiments, a VR space is a shared virtual environment (SVE) where multiple users may interact using avatars (e.g., user avatar B (251), evaluator avatar Z (252)). For illustration, user avatar B (251) may be an examinee that is performing a particular user assessment with VR space X (200), while evaluator avatar Z (252) may be another user that is evaluating the user assessment and is connected remotely to a user device providing the VR space X (200). As such, multiple evaluators may access a VR space, e.g., in order to provide feedback (e.g., evaluator feedback B (254)) to a user in real time during the user assessment or for use in scoring the examinee. A user's headset (e.g., user's headset Y (272)) may present a VR space to the user (e.g., VR image data Q (264) may display VR plant component A (231), VR task component B (232), and a VR plant component C (233) to the user operating user avatar B (251)). Likewise, an evaluator may use a headset (e.g., evaluator's headset Z (280)) to view a VR space (e.g., VR image data R (263) may describe user avatar B (251) in VR space X (200) to the evaluator using evaluator's headset Z (280)).

Furthermore, an avatar may be a simulated representation of a user, which may be operated by a user's movements in a physical area that corresponds to a VR space. As such, avatars may implement various expressive systems, such as integrating body movement, hand gestures, facial expressions, and eye gazes into a virtual reality environment. A user's interactions within a VR space may be through the eyes of an avatar from a first-person point of view. In FIG. 2B, various viewpoints for various user avatars are shown within VR space X (200) (e.g., viewpoint A (281) corresponds to a stereoscopic vision of an examinee based on user avatar B (251) and viewpoint Z (282) corresponds to a stereoscopic vision of an evaluator based on evaluator avatar Z (252)). Thus, the examiner may be scored in the user assessment with respect to touch inputs, verbal responses, and nonverbal cues based on avatar control. Examples of nonverbal cues may include eye gazes at various VR components, (such as in response to a particular environmental factor), facial expressions, hand gestures, body movement, and posture.

In some embodiments, for example, a user assessment manager may automatically determine whether an examinee is performing a correct procedure at a corresponding stage of a user assessment. For example, an examinee may provide one or more touch inputs (e.g., touch input B (253)) with respect to one or more VR task components (e.g., VR task component B (232)) using a touch controller (e.g., touch controller Y (271)), a headset (e.g., user's headset Y (272)), or another VR input device, such as one or more VR controllers for other user limbs or appendages (not shown) during the user assessment. For example, touch inputs may be produced in response to a touch controller (e.g., touch controller Y (271)) or a headset (e.g., user's headset Y (272), evaluator's headset Z (280)) communicating with tracking sensors (e.g., tracking sensors Y (273)). These touch inputs may be analyzed by a user assessment manager to score a user's performance of a respective task in the user assessment.

In some embodiments, a user is scored based on nonverbal cues. For example, a user's eye gaze to different VR components may be used to determine whether a particular safety procedure was accurately followed by an examinee. Moreover, the user assessment manager may analyze a user's eye gaze within a VR space based on different eye gaze data, such inferring eye gaze from head orientation or using one or more gaze models that determine naturalistic eye movement for avatars using behavioral properties such as fixation points and durations, saccade magnitude, and velocity. In some embodiments, the user assessment manager performs a tracked gaze operation. In some embodiments, eye gaze data for a user assessment is determined using one or more artificial intelligence models, such as deep neural networks.

Figure 3:
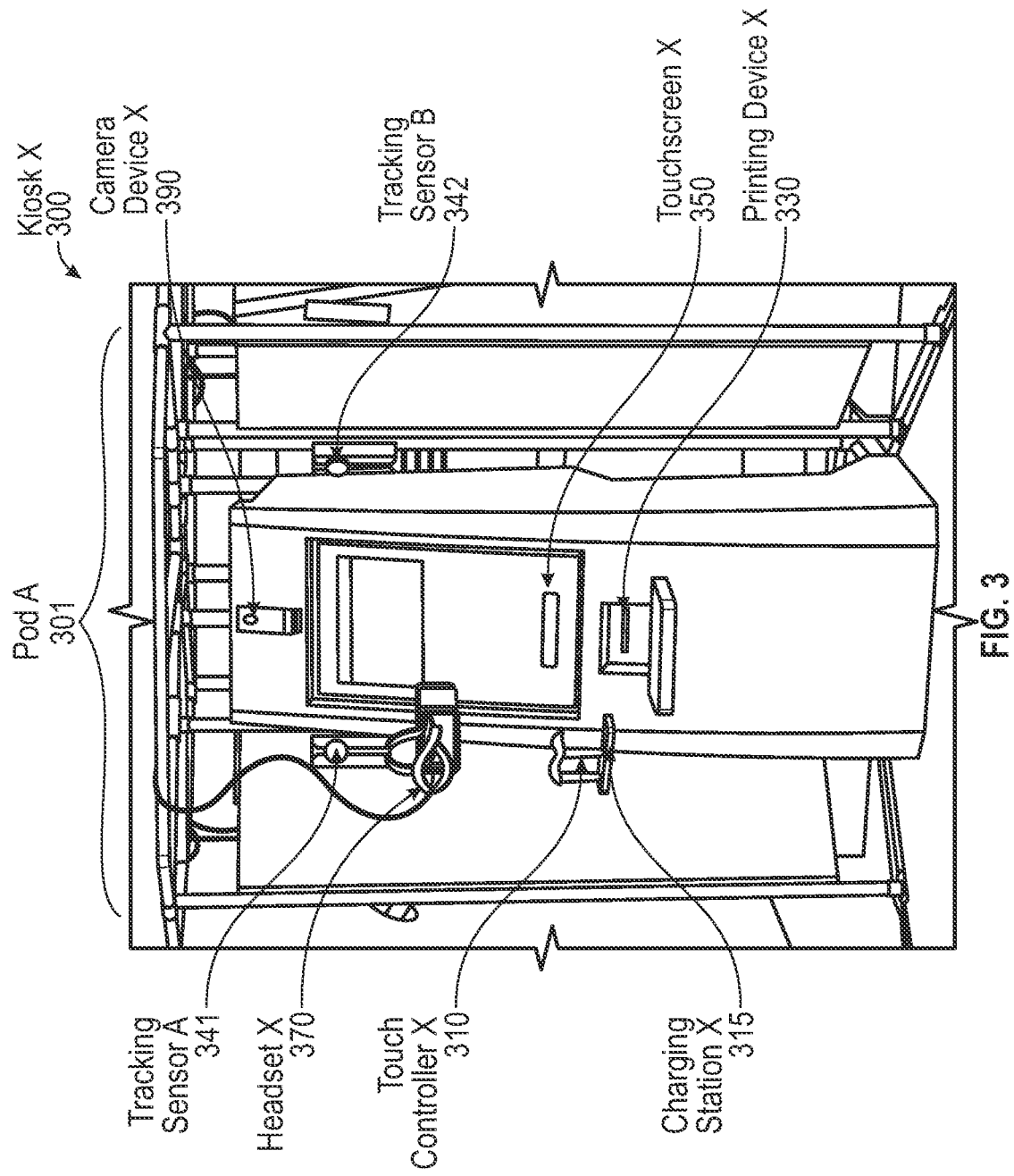

Turning to FIG. 3, FIG. 3 shows a schematic diagram in accordance with one or more embodiments. In FIG. 3, a kiosk (e.g., kiosk X (300)) may be a user device that includes multiple pods (e.g., pod A (301)) for different users performing user assessments at the kiosk. Moreover, a pod in a kiosk may include one or more camera devices (e.g., camera device X (390)), one or more tracking sensors (e.g., tracking sensor A (341), tracking sensor B (342)), a headset (e.g., headset X (370), one or more touch controllers (e.g., touch controller X (310)), one or more charging stations for touch controllers (e.g., charging station X (315)), one or more touchscreens (e.g., touchscreen X (350)) or other types of user interfaces, and/or one or more printing devices (e.g., printer X (330)). A charging station may be used to provide a charging power signal to touch controllers or a wireless headset to replenish internal batteries. Moreover, a playing area may be disposed in front of a kiosk where a user can move while performing a user assessment in a VR space. The camera device may provide self-registration at the kiosk as well as to implement one or more anti-cheating algorithms. The printing device may provide a printed paper copy of a user assessment result, e.g., for examinee. The printed copy may include a user's results and feedback after the end of a VR session.

For a particular pod, a user assessment manager may generate a particular VR space for a user performing a user assessment in the given pod. On the other hand, different pods may have different users performing different types of user assessments using their own distinct VR spaces. Thus, a user assessment manager may operate multiple VR spaces simultaneously, such that multiple examinees may perform user assessments based on their personal job traits. Furthermore, a kiosk may not need various types of cloud-based infrastructure to provide user assessments. In other words, a user assessment manager in a respective kiosk may provide hardware and/or software locally for users to generate VR image data and/or AR image data with corresponding VR components. Likewise, a kiosk may also allow remote users, such as evaluators, to log into a live VR session of a user assessment. For example, a user assessment server may match one or more remote evaluators with one or more pods among multiple kiosks. For users, a user assessment manager in a kiosk may provide a user interface that obtains user details, such as user credentials and user registration information, and crosschecks the data against database records (e.g., by communicating with a user assessment server) prior to allowing a user assessment session to begin.

In some embodiments, a kiosk includes a fingerprint scanner to perform fingerprint recognition as one type of authentication method at a pod. For example, fingerprint recognition may be performed in connection with a national database on a remote server to verify one or more test takers. In particular, the fingerprint recognition may be used with some users who may not have provided biometric data prior to performing the user assessment.

Figure 4:
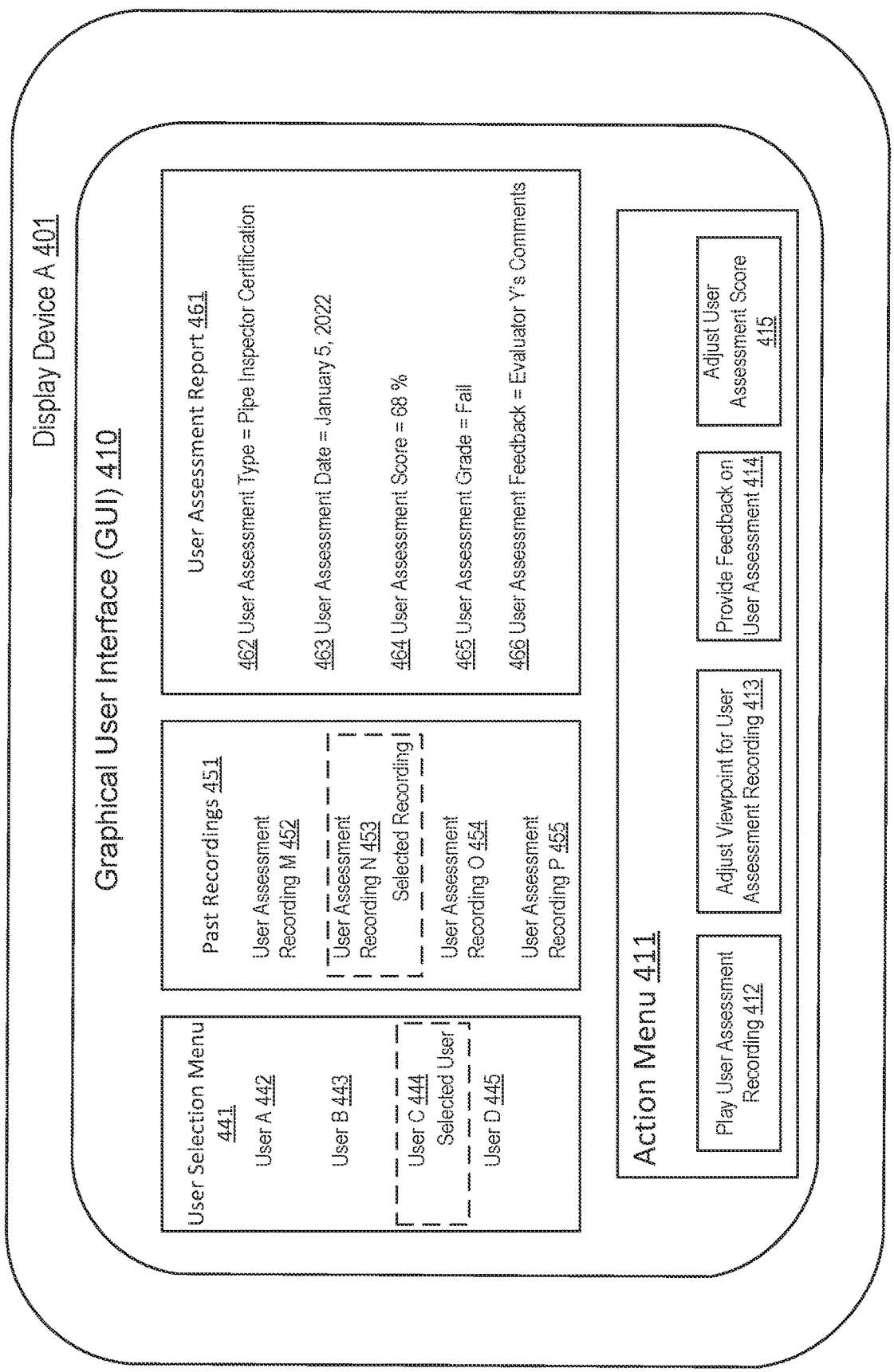

Turning to FIG. 4, FIG. 4 is a schematic diagram in accordance with one or more embodiments. In FIG. 4, a graphical user interface (GUI) (410) may be presented using a display device A (401) of a user device (not shown). Here, the GUI (410) may provide information regarding various user assessments based on a user selection. For example, a user selection menu (441) may identify user A (442), user B (443), user C (444), and user D (445). Based on a user selection of user C (444), past recordings of user C (451) may be shown, i.e., user assessment recording M (452), user assessment recording N (453), user assessment recording O (454), and user assessment recording P (455). Based on a user selection of user assessment recording N (453), the user may receive a user assessment report (461) that identifies the user assessment type (462), the user assessment date (463), the user assessment score (464), the user assessment grade (465), and user assessment feedback (466). For example, the user assessment feedback (466) includes user feedback from an evaluator Y who observed the user assessment in real time.

Keeping with FIG. 4, in some embodiments, an action menu (411) is provided by GUI (410). In particular, a user may select an option to player a user assessment recording (412), adjust a viewpoint for user assessment recording (413), provide feedback on a user assessment (414), and/or adjust a user assessment score (415).

Returning to FIG. 1, a user assessment manager may use one or more AI models (e.g., AI models X (157)) and/or one or more AI algorithms (e.g., AI algorithms X (158)) for user authentication and/or performing a particular user assessment. Examples of AI models may include linear regression models, logistic regression models, decision trees, naïve bayes models, and various machine-learning models, such as artificial neural networks and support vector machines. Likewise, AI algorithms may include one or more rule-based algorithms that implement automation within a user assessment, such as for automating tasks, as well as various machine-learning algorithms for training a machine-learning model. In some embodiments, for example, an AI model may be used for biometric verification to predict whether a user requesting a user assessment at a kiosk is the same user shown in user credentials or user registration data. In some embodiments, an AI model may be used to measure a user's performance at one or more tasks, such as by detecting a user's eye gaze.

Turning to machine learning, different types of machine-learning models may be trained, such as convolutional neural networks, deep neural networks, recurrent neural networks, support vector machines, decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include a support vector machine and multiple neural networks. In some embodiments, the carbon dioxide manager may generate augmented data or synthetic data to produce a large amount of interpreted data for training a particular model.

In some embodiments, various types of machine learning algorithms may be used to train the model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of electric-power data, production data, reservoir data such as wellhead data or sensor data), with the output of the recurrent neural network being dependent on past computations (e.g., future production rates at a given production well may be in response to past stimulation operations at one or more injection wells and past production from the respective reservoir). As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks.

Keeping with FIG. 1, various virtual plant facilities are contemplated for a VR space, such as a VR environments for a gas-oil separation plant (GOSP), a manufacturing plant, a refinery, or another type of plant. A VR space may include plant equipment that is used to perform one or more plant processes, such as gas operations, piping operations, refining operations, safety protocols, maintenance protocols, inspection protocols, etc. However, other non-oil industries are also contemplated, such as automotive plants, chemical plants that produce polymer and other materials from chemical inputs, electric power plants, and metal manufacturing plants. Examples of VR components in a VR space may include storage tanks, heat exchangers, accumulators, boilers, pumps, inlet separators, coolers, evaporators, plant sensors, plant instruments, gauges, control switches, valves, emergency stop controls, pressure relief equipment, flaring equipment, smoke detectors, toxic gas detectors, thermal detectors, combustible gas detectors, electric power generators, turbines, exhaust fans, light panels, fume scrubbers, safety showers, and other plant equipment.

While some embodiments are described with respect to virtual reality, it is contemplated that virtual reality may include pure virtual reality, augmented reality, mixed reality, and various other combinations of simulated virtual environments and real-world environments. Thus, VR image data may include both pure VR data, augmented reality data, image data acquired from camera devices, and synthetic data produced using computer imaging. Likewise, augmented reality data may be readily substituted by pure VR data in various embodiments.

While FIGS. 1, 2A, 2B, 3, and 4 shows various configurations of components, other configurations may be used without departing from the scope of the disclosure. For example, various components in FIGS. 1, 2A, 2B, 3, and 4 may be combined to create a single component. As another example, the functionality performed by a single component may be performed by two or more components.

Figure 5:
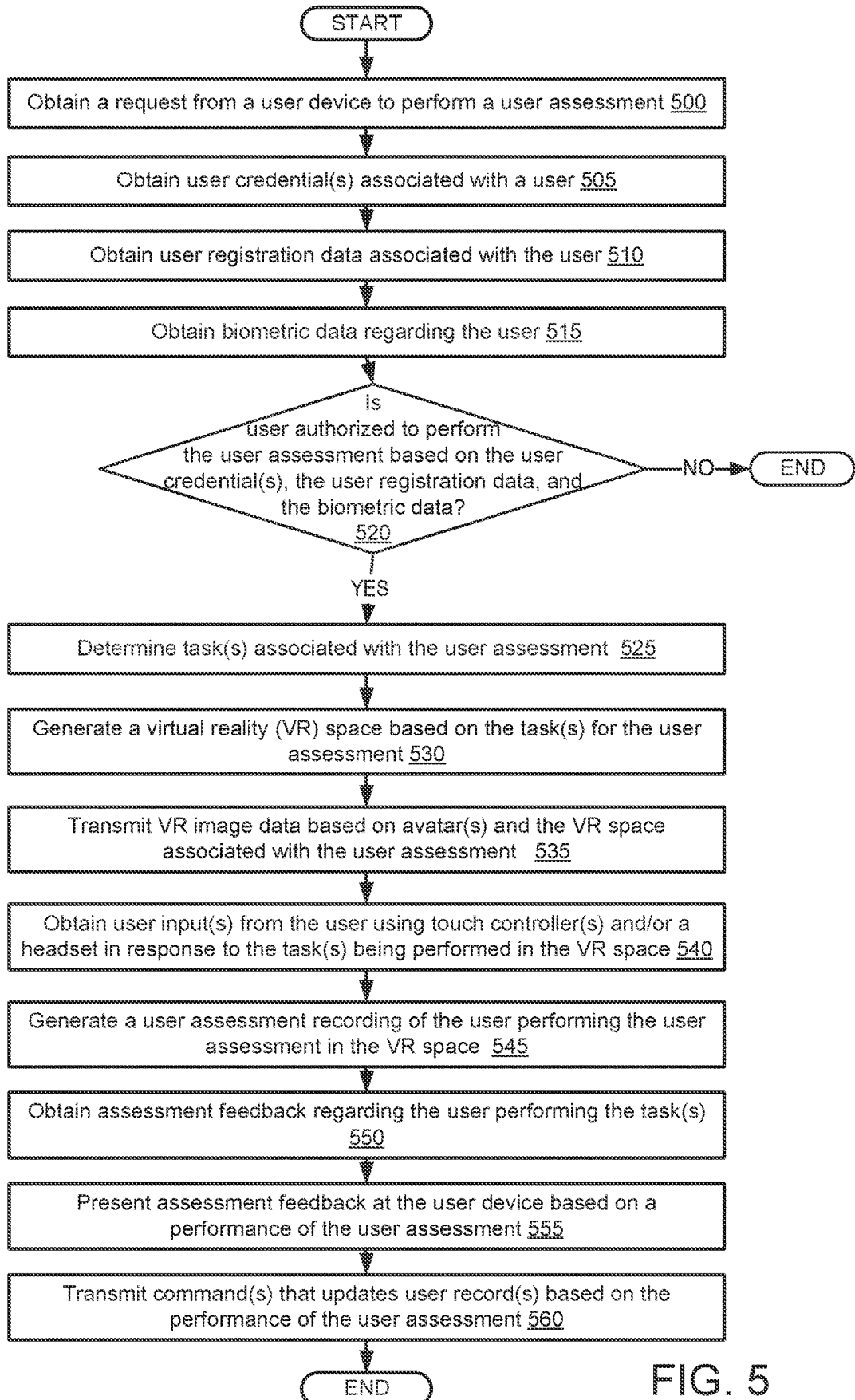
FIG. 5 shows a flowchart in accordance with one or more embodiments.

Turning to FIG. 5, FIG. 5 shows a flowchart in accordance with one or more embodiments. Specifically, FIG. 5 describes a general method for managing user assessments in VR spaces. One or more blocks in FIG. 5 may be performed by one or more components (e.g., user assessment server X (150), user assessment manager A (169)) as described in FIGS. 1, 2A, 2B, 3, and 4. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, a request is obtained from a user device to perform a user assessment in accordance with one or more embodiments. In particular, a user may submit a request on a user device, such as a kiosk, operation station, or other user device, to perform a user assessment. The request may be transmitted to a user assessment server to determine whether the user is authorized to take the user assessment. For example, a user may login into the user device with the user credentials prior to submitting the request. The request may be a data message automatically transmitted by the user device to a user assessment server that triggers an authentication operation.

In Block 505, one or more user credentials are obtained that are associated with a user in accordance with one or more embodiments. For example, the user credentials may be similar to the user credentials A (178) or user credentials E (129) described above in FIG. 1 and the accompanying description.

In Block 510, user registration data are obtained that are associated with a user in accordance with one or more embodiments. For example, a user may use the same or a different user device to register for a user assessment as is used to perform the user assessment. Based on the user registration, a user may be assigned a specific date, time, location, or provide preapproval to perform the user assessment. In other words, the user registration may assign the user to a particular user device (e.g., the user is assigned a specific pod at a specific kiosk at a particular date and time) for performing his desired user assessment. As such, a user may submit the user registration data with the request or outside the request. For example, after logging into the user device, the user may manually enter the user registration data. Likewise, a user may obtain user registration data upon paying for the user assessment and/or providing documents identifying the user's eligibility for taking the user assessment (e.g., birth certificate, driver's license number, employment information).

In Block 515, biometric data are obtained regarding a user in accordance with one or more embodiments. Prior to accessing the user assessment, a user device may obtain biometric data from a user, such as a personal identification, picture, video, a fingerprint scan, a hand scan, etc. The user device may also obtain an ID picture as part of the onboarding interface. Thus, the biometric data may be analyzed automatically with no human support to authenticate whether the user is authorized to perform the user assessment. For example, the biometric data may be similar to the biometric data A (179) described above in FIG. 1 and the accompanying description.

In Block 520, a determination is made whether a user is authorized to perform a user assessment based on one or more user credentials, user registration data, and/or biometric data in accordance with one or more embodiments. For example, a server or a user device may confirm a user's identity and whether the user is authorized to perform a specific user assessment at that time. Based on this confirmation, the user's booking may be verified for a particular user assessment at the current user device. The confirmation may be performed based on matching a user with a profile associated with user registration data using facial recognition and/or voice recognition software. In some embodiments, one or more artificial intelligence techniques are used to match a user at a user device with the user associated with user registration data. If it is determined that the user is authorized to perform the user assessment, the process may proceed to Block 525. If it is determined that the user is not authorized, the process may end.

In Block 525, one or more tasks are determined for a user assessment in accordance with one or more embodiments. Based on a user's registration data, a user assessment manager may automatically load an appropriate certification test. For example, the user assessment manager may select a series of tasks associated with an industrial user assessment. During the user assessment, various tasks may be used to test a user's knowledge (e.g., a specific sequence of operations or inputs relating to which tasks need to be performed, when should a task be performed, and where should the task be performed) and/or aptitude for performing a particular task (such as turning gauges and valves at a particular speed in response to an emergency). In some embodiments, tasks may be analyzed based on a user's position during task performance, such as a user's standing location within a VR space. More specifically, tasks within a user assessment may measure various safety protocols, where a user may need to be at a certain distance or at a certain angle (e.g., away from a wind direction) with respect to various plant components related to the task. Different tasks may depend on a type of performance test that is associated with different types of industrial certifications. In a hazard recognition assessment, for example, a user may simply walk around a VR space and identify potential hazards among various VR components.

In Block 530, a VR space is generated based on one or more tasks for a user assessment in accordance with one or more embodiments. In particular, a user assessment manager may provide a VR space that enables local users and remote users to access a particular VR session. Local user and remote users may be represented within the VR space as individual avatars, such as a user avatar performing a user assessment, one or more evaluator avatars for evaluators of the user assessment, and/or any avatars for other observers logged in locally or remotely. The VR space may be similar to the VR space X (200) described above in FIGS. 2A and 2B and the accompanying description.

In Block 535, VR image data are transmitted based on one or more avatars and a VR space associated with a user assessment in accordance with one or more embodiments. In particular, a user device or a remote server may operate various virtual reality scenarios for various user assessments. Depending on a user's viewpoint, for example, different VR image data may be provided to a user, e.g., through a headset or another display device. The VR image data may be transmitted to one or more local devices at a user device, such as headsets and display devices, or across a network, such as to an evaluator's display device monitoring the user assessment.

In Block 540, one or more user inputs are obtained from a user using one or more touch controllers and/or a headset in response to one or more tasks being performed in a VR space in accordance with one or more embodiments. For example, a user device may receive user inputs from touch controllers, a headset, and/or other VR input devices (e.g., joysticks, game controllers, etc.) in response to various user interactions within the VR space. Example user inputs may include hand interactions with interactive parts such as VR valves and VR gauges. Likewise, a test taker's line of sight may also be its own user input, e.g., where eye movement may determine whether the user has observed visual queues for various environmental factors, such as wind direction. Based on user inputs in the VR space, a user assessment manager may determine whether the user passed or failed a particular task or user assessment, e.g., a user may fail a given task if he performs the task in an unsafe position.

In Block 545, a user assessment recording is generated of a user performing a user assessment in a VR space in accordance with one or more embodiments. In some embodiments, for example, a recording may be generated from multiple views of a user avatar, such as a user viewpoint based on a user's line of sight within a headset, multiple third-person views of a test taker at different angles in a virtual environment, and one or more assessment views that provide detailed assessment feedback regarding the user's actions for each task. In particular, a VR session may be recorded at a static third-person view to see the context in which a task is performed by the user. Thus, an evaluator auditing the user assessment recording may experience a better perspective in showcasing the user's inputs and actions.

In some embodiments, the user assessment recording is a mixed-reality image or video file. In particular, a test taker may be photographed in a physical environment near a user device during a particular VR session. Using image data of the test taker in the physical environment, a third-party view may integrate VR image data with the image data of the test taker.

In Block 550, assessment feedback is obtained based on a user performing one or more tasks in accordance with one or more embodiments. The assessment feedback may identify whether a user passed or failed a user assessment or a particular task. Likewise, the assessment feedback may include score information (e.g., the user's grade is "73%" where "70%" is passing), comments regarding areas of improvement, and any other feedback. In some embodiments, the assessment feedback is automatically generated by a user assessment manager. For example, the assessment feedback may include predetermined scores associated with a user's inputs in response to a given task. Likewise, the assessment feedback may also include descriptive information regarding explain why a user's actions are correct or incorrect based on various VR components and/or VR environmental factors disposed in a VR space.

In some embodiments, assessment feedback is generated using one or more artificial intelligence (AI) models or AI algorithms. For example, a user assessment manager may track a user's eye gaze while performing a given task. Based on the user's eye gaze, different assessment feedback may be automatically generated accordingly. For example, a task may require a user to read a poster or verify wind direction through looking at a wind flag. Based on the user's eye gaze during the task, it may be confirmed whether the user read the poster or verified wind direction.

In some embodiments, the assessment feedback is obtained from a user device that is observing the user performing the user assessment. For example, an evaluator may remotely observe a test taker from a third-party viewpoint within the VR space. The evaluator may watch the user perform the assessment, and the evaluator may provide assessment feedback directly to the test taker through the VR space (e.g., using an evaluator avatar speaking to the test taker) or as post-assessment feedback explaining the results of the user assessment. For example, assessment feedback may be added to an employment record or form a portion of a paper hardcopy of a user assessment report printed for the test taker.

In Block 555, assessment feedback is presented at a user device based on a performance of a user assessment in accordance with one or more embodiments. For example, assessment feedback may be presented in the same VR space at the end of the user assessment. Likewise, the assessment feedback may be presented on a display device coupled to a user assessment manager. In some embodiments, the assessment feedback is presented to a user using a printing device coupled to a user device that performs the user assessment.

In Block 560, one or more commands are transmitted that update one or more user records based on a performance of a user assessment in accordance with one or more embodiments. For example, a user assessment server or user assessment manager may transmit a command to update user records in one or more employer databases against the user's records.

Figure 6A:
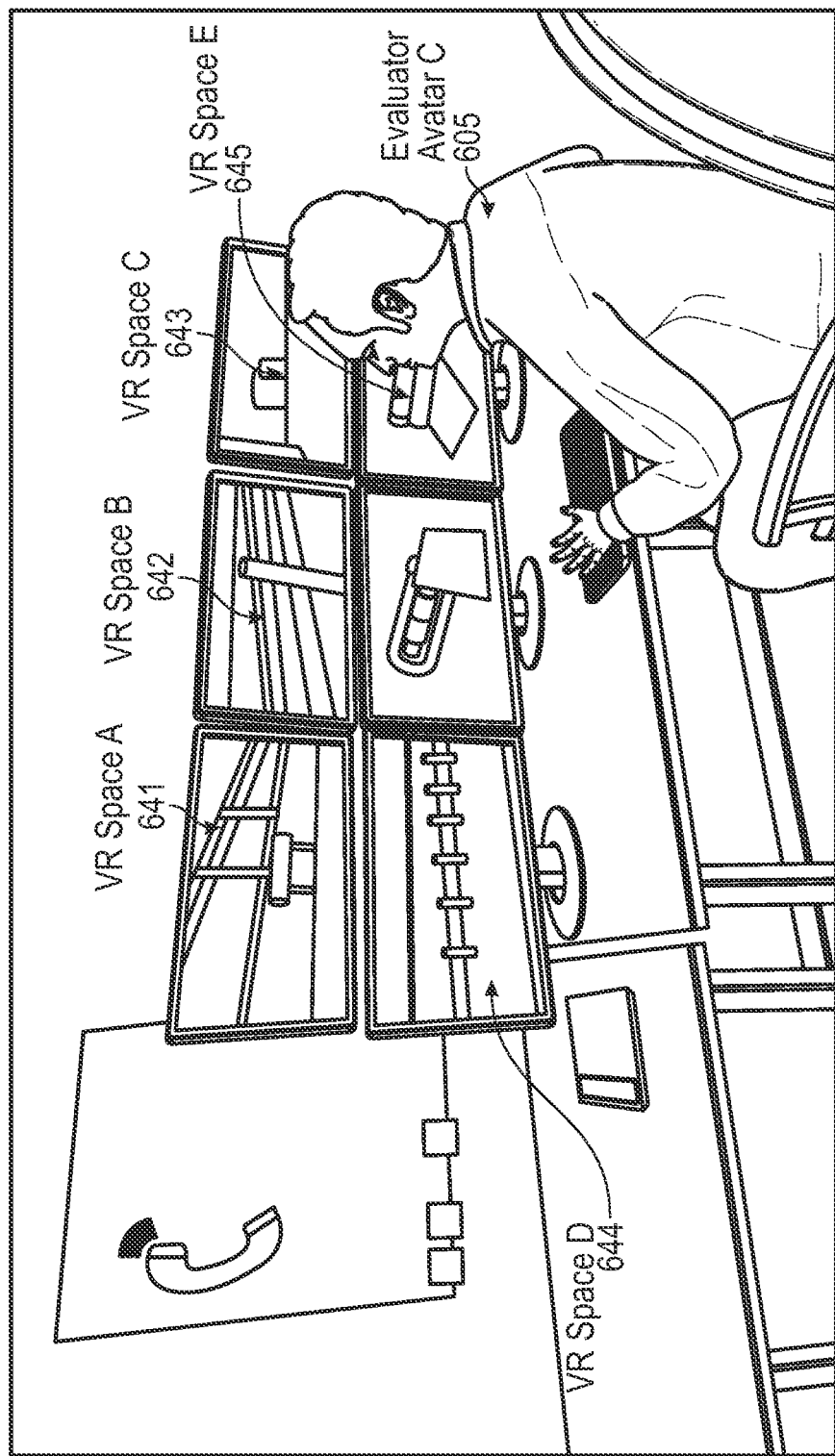
FIGS. 6A, 6B, 6C, 6D, 6E, 6F, and 6G show examples in accordance with one or more embodiments.

Turning to FIGS. 6A, 6B, 6C, 6D, 6E, 6F, and 6G, FIGS. 6A, 6B, 6C, 6D, 6E, 6F, and 6G provide examples of performing user assessment in virtual reality spaces in accordance with one or more embodiments. The following example is for explanatory purposes only and not intended to limit the scope of the disclosed technology. In FIG. 6A, an evaluator device has established network connections to multiple user devices with ongoing virtual reality sessions. In particular, a virtual reality (VR) space is generated with an evaluator avatar C (605) at the evaluator device, which shows various VR spaces, i.e., VR space A (641), VR space B (642), VR space C (643), VR space D (644), and VR space E (645). Accordingly, a user operating the evaluator avatar C (605) may select one of the VR spaces (641, 642, 643, 644, 645) to observe and communicate with a particular test taker.

Figure 6B:
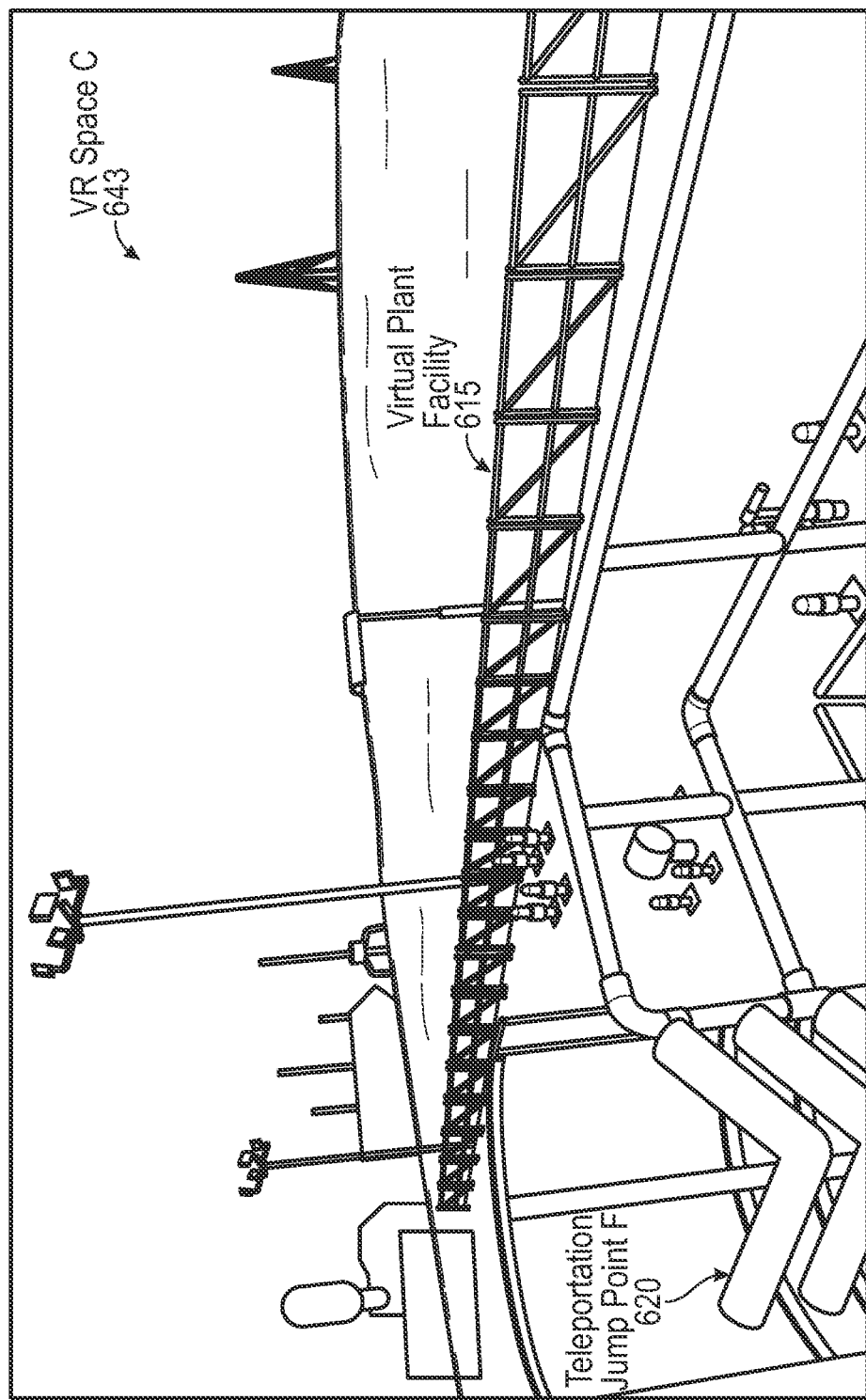
Figure 6C:
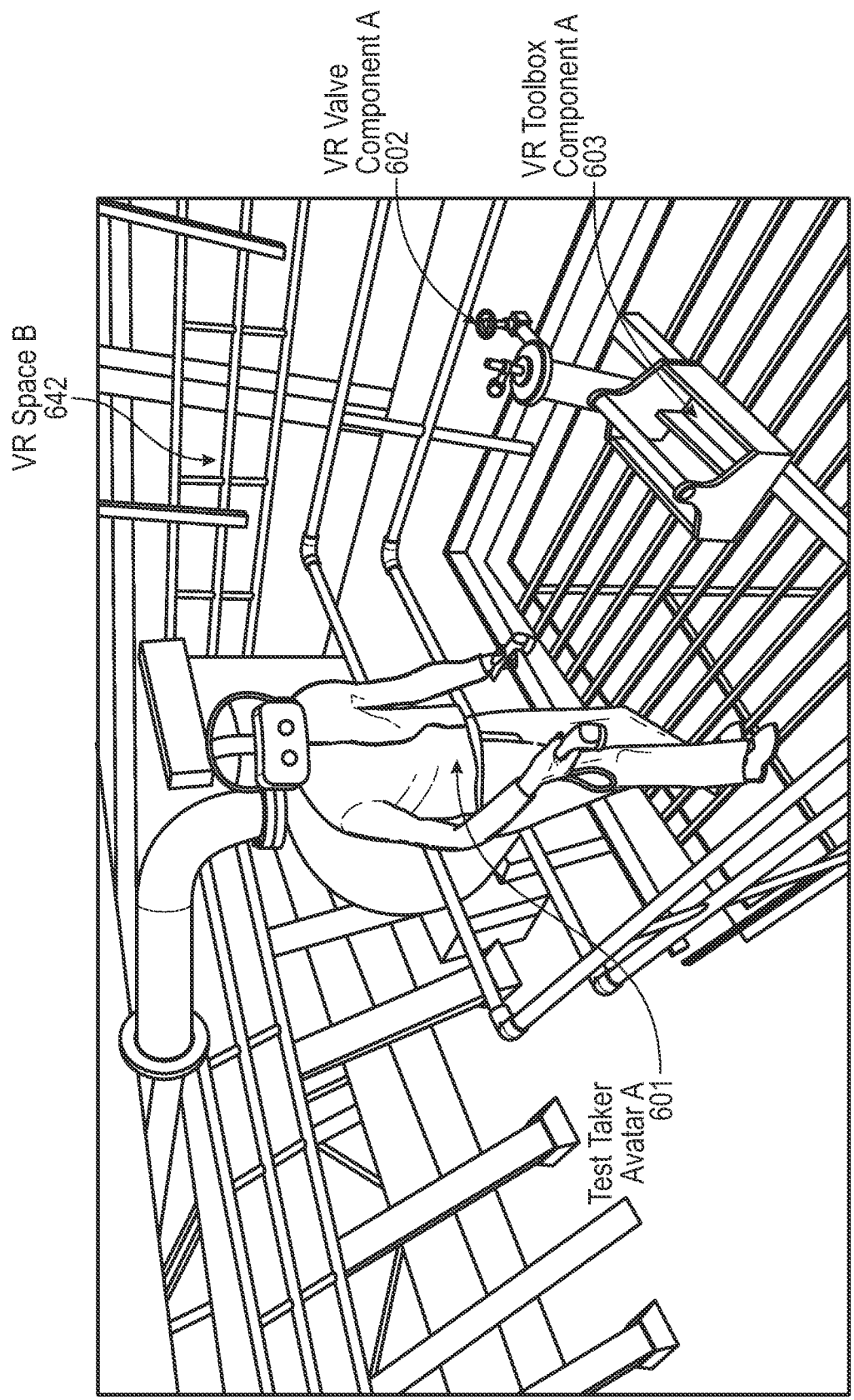

In FIG. 6B, a first-person viewpoint of a test taker is shown in VR space C (643), where the test taker sees a virtual plant facility (615) and a teleportation jump point F (620) for traversing different areas within the VR space C (643). In FIG. 6C, a third-person viewpoint is shown for VR space B (642), such as a viewpoint provided to an evaluator device. Here, the test taker avatar A (601) is a mixed reality avatar based on image data a user device's camera and VR image data associated with the respective user assessment. The VR space B (642) includes a VR valve component A (602) and a VR toolbox component A (603).

Figure 6D:
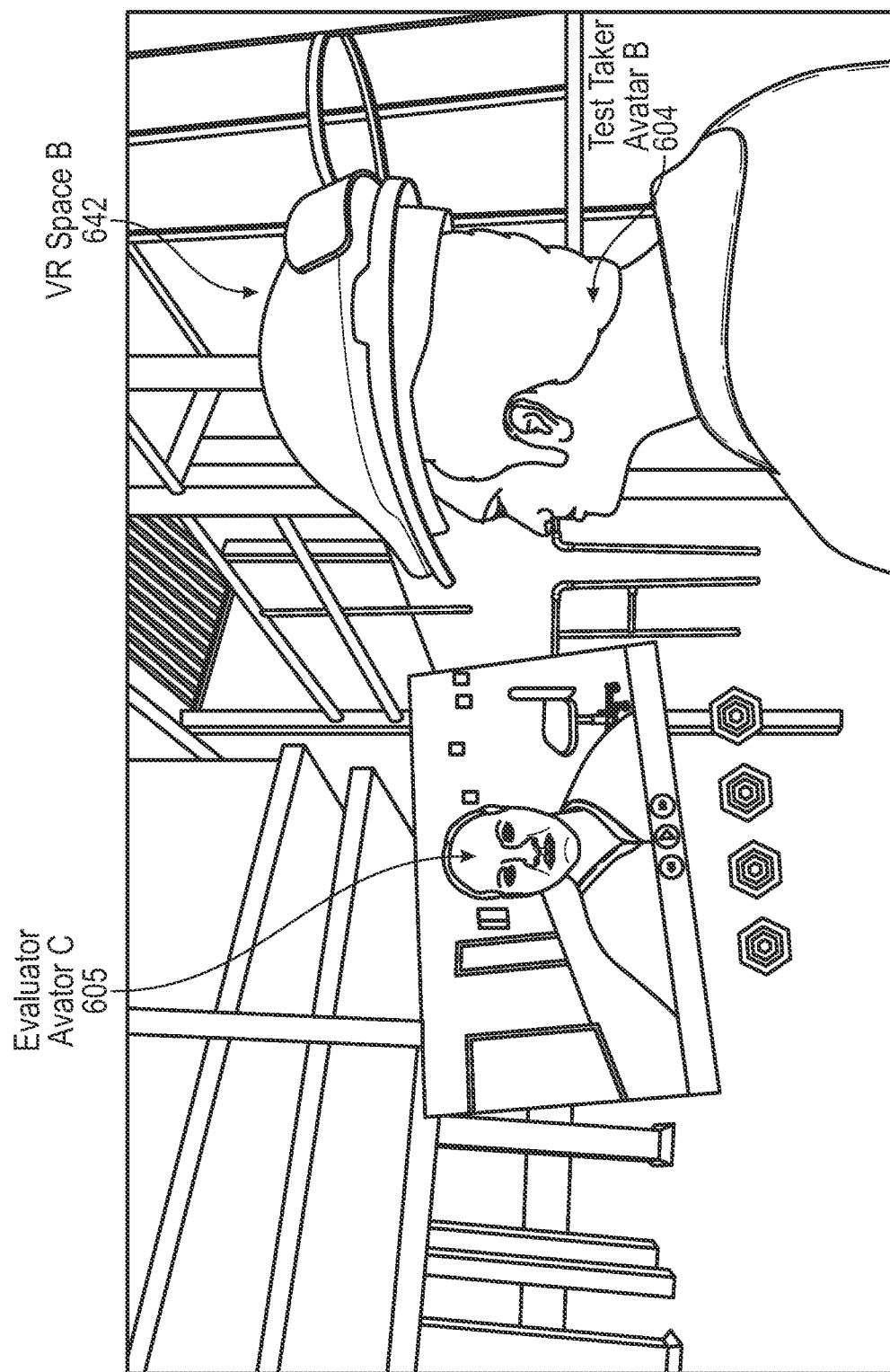
Figure 6E:
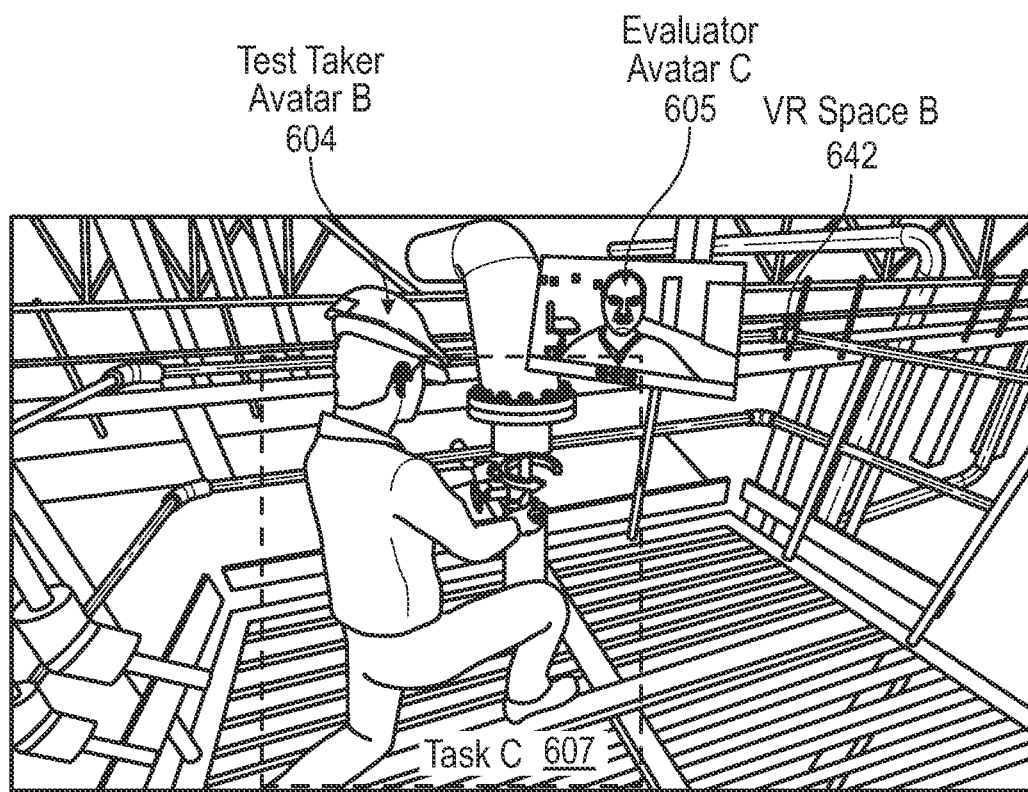
Figure 6F:
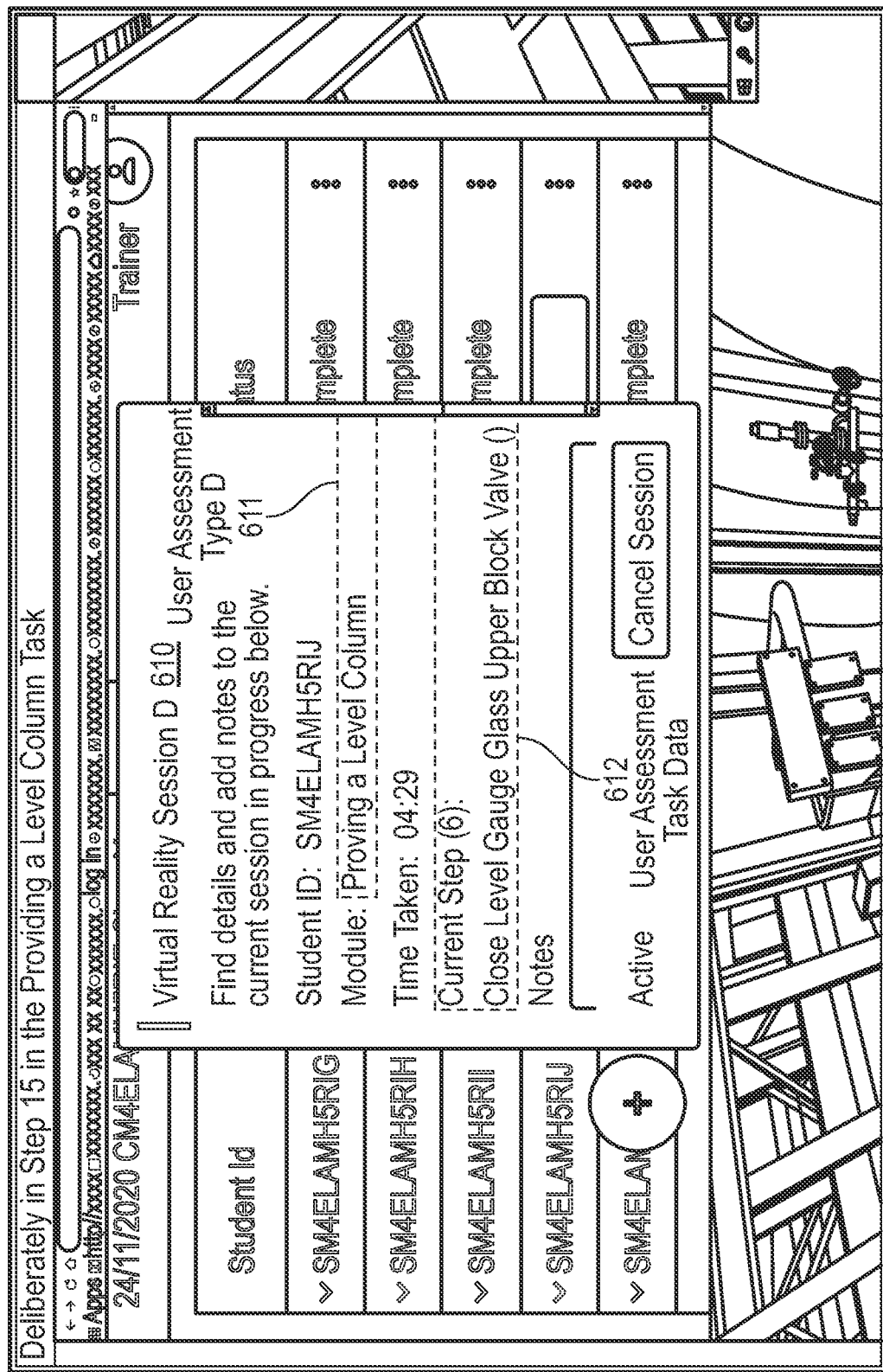
Figure 6G:
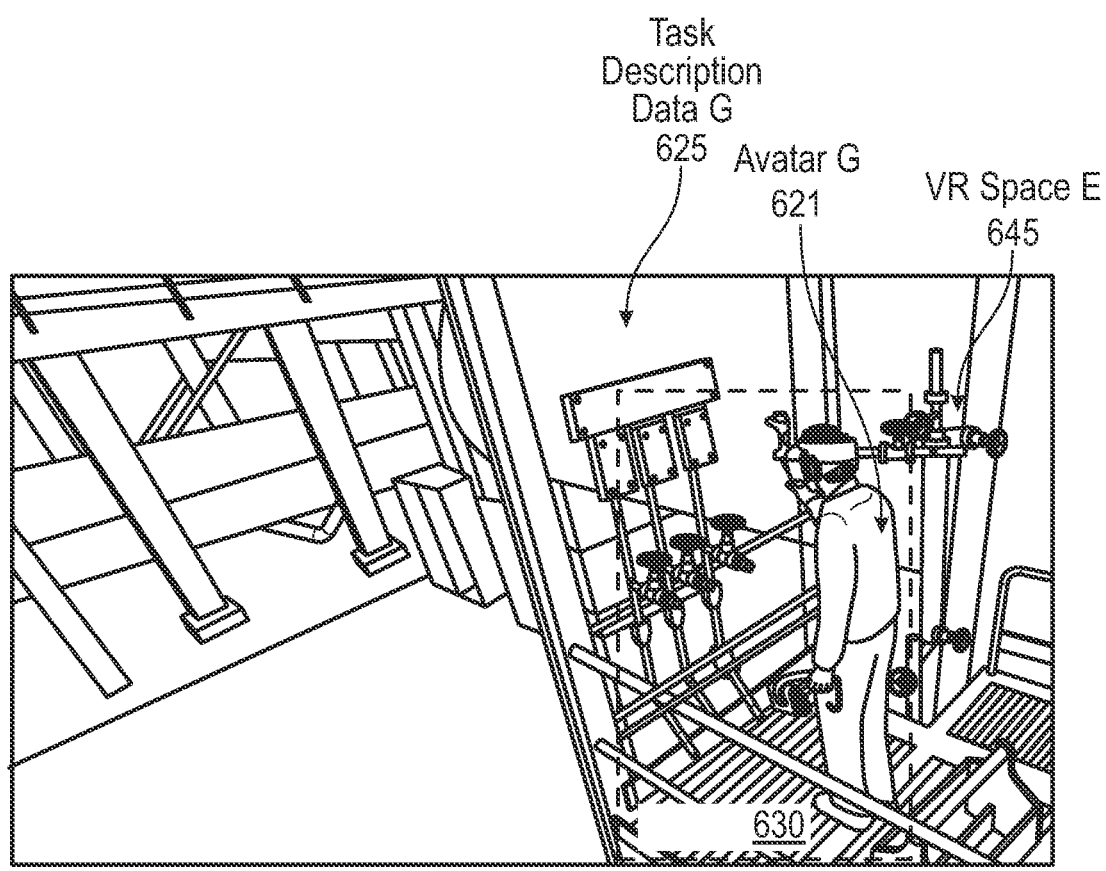

In FIG. 6D, an evaluator has selected VR space B (642) to observe. Thus, an evaluator avatar C (605) appears in the VR space B (642) to test taker avatar B (604) in order to provide audio assessment feedback. In FIG. 6E, evaluator avatar C (605) oversees the test taker B (604) performing task C (607) in VR space B (642). In FIG. 6F, a virtual reality session D (610) is shown that describes various assessment information, such as a user assessment type D (611), and user assessment task data D (612). Finally, in FIG. 6G, task description data G (625) is shown to an avatar G (621) regarding performance of task G (630).

Figure 7:
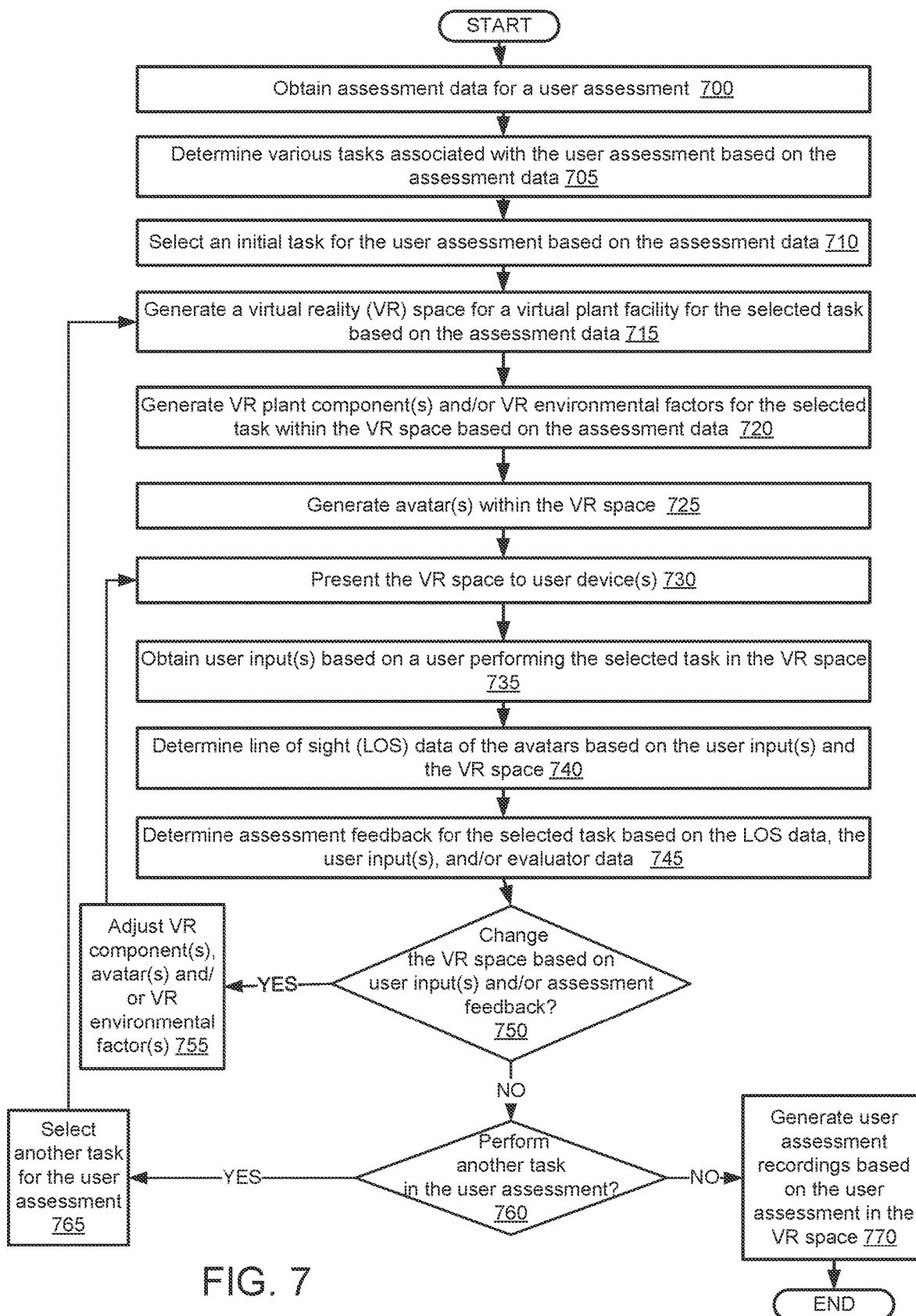
FIGS. 7, 8, and 9 show flowcharts in accordance with one or more embodiments.

Turning to FIG. 7, FIG. 7 shows a flowchart in accordance with one or more embodiments. Specifically, FIG. 7 describes a specific method for managing and/or adjusting a VR space for a user assessment. One or more blocks in FIG. 7 may be performed by one or more components (e.g., user assessment manager A (169)) as described in FIGS. 1, 2A, 2B, 3, and 4. While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 700, assessment data are obtained for a user assessment in accordance with one or more embodiments. For example, different user assessments may be defined according to predetermined attributes, predetermined VR components, VR environments, and/or tasks. Based on selecting a particular user assessment, a user device may determine which assessment data corresponds to the selected user assessment. For example, a user assessment manager may access a database that identifies what assessment data corresponds to a requested user assessment.

In Block 705, various tasks are determined based on assessment data in accordance with one or more embodiments. In some embodiments, an evaluator observing a user assessment may adjust one or more tasks for a user assessment, such as to avoid users memorizing answers from past assessments. Likewise, a user assessment manager may have multiple options for different tasks, such that different tasks may be selected for users performing the same type of certification.

In some embodiments, one or more tasks are part of a dynamic assessment. In a dynamic assessment, a user may have branching scenarios for one or more tasks, where a particular action may be neither right or wrong. However, a user may be assessed or scored based on one or more subsequent actions performed by the user within a VR space.

In Block 710, an initial task is selected for a user assessment from various tasks in accordance with one or more embodiments. In some embodiments, a user assessment may have a predefined sequence of tasks, where tasks may be selected according to the sequence. On the other hand, tasks may be randomly selected throughout the user assessment.

In Block 715, a VR space is generated for a virtual plant facility for a selected task based on assessment data in accordance with one or more embodiments. For example, the VR space may be similar to the VR space X (200) described above in FIGS. 2A and 2B and the accompanying description.

In Block 720, one or more VR plant components and/or one or more VR environmental factors are generated for a selected task within a VR space based on assessment data in accordance with one or more embodiments. For example, the VR components may be similar to VR plant component A (231), VR task component B (232), or VR plant component C (233) described above in FIGS. 2A and 2B and the accompanying description.

In Block 725, one or more avatars are generated within a VR space in accordance with one or more embodiments. More specifically, a user assessment manager may generate a user avatar for the user undergoing a user assessment. Likewise, other avatars may be generated for one or more observers, such as multiple remote evaluators logged into a user device to witness the user assessment. For example, the avatars may be similar to user avatar B (251) or evaluator avatar Z (252) described above in FIGS. 2A and 2B and the accompanying description. The avatars may be virtual reality representations of particular users. In some embodiments, an avatar is a mixed reality or augmented reality representation based on image data collected from a camera device.

In Block 730, a VR space is presented to one or more user devices in accordance with one or more embodiments. For example, avatars, VR components with accompanying VR environmental factors, and various virtual reality environments may be presented in one or more headsets, display devices, and other types of VR viewing devices.

In some embodiments, for example, an evaluator loads an application on his or her user device with a user interface in order to see various user assessments occurring in real time (e.g., the user assessments may include hundreds across many different plants and locations across the globe). The evaluator may select one or more VR sessions in order to remotely access the VR space for a particular location or user. Once logged into a VR session, the evaluator may be presented with the undergoing user assessment in a 360-degree immersed virtual reality environment.

In Block 735, one or more user inputs are obtained based on a user performing a selected task in a VR space in accordance with one or more embodiments. For example, the touch controllers and/or the headsets may be similar to the touch controllers or the headsets, respectively, described above in FIGS. 1, 2A, and 2B and the accompanying description.

In Block 740, line of sight (LOS) data of one or more avatars are determined based on one or more user inputs and a VR space in accordance with one or more embodiments. In particular, a user's viewpoint may be analyzed to determine LOS data, such as which VR components are being viewed by a user. In an inspection assessment, LOS data may be analyzed to determine whether a test taker examined all components required to perform a selected task. Likewise, LOS data may also describe the amount of time that a user review a particular component or situation (e.g., a user assessment manager may automatically determine a safety task was failed because the user did not review a component for a predetermined amount of time).

In Block 745, assessment feedback for a selected task is obtained based on LOS data, one or more user inputs, and/or remote evaluator data in accordance with one or more embodiments.

In Block 750, a determination is made whether to change a VR space based on one or more inputs and/or assessment feedback in accordance with one or more embodiments. For example, an evaluator device may transmit one or more commands to a user device performing a user assessment to modify the VR space, e.g., to initiate changes to a user assessment in real time or provide additional instruction, such as where a user failed a particular task. Likewise, a VR environment may be automatically adjusted, such as for dynamic assessments with branching options in response to user inputs. If it is determined that no changes are to be made to the VR space, the process may proceed to Block 760. If it is determined to change the VR space, the process may proceed to Block 755.

In Block 755, one or more VR components and/or one or more VR environmental factors are adjusted in accordance with one or more embodiments.

In Block 760, a determination is made whether to perform another task in a user assessment in accordance with one or more embodiments. If it is determined that one or more tasks remain for a user assessment, the process may proceed to Block 765. If it is determined that the user assessment is finished, the process may proceed to Block 770.

In Block 765, another task is selected for a user assessment in accordance with one or more embodiments.

In Block 770, one or more user assessment recordings are generated based on a user assessment in a VR space in accordance with one or more embodiments. For example, user assessment recordings may be generated for multiple viewpoints of one or more avatars during performance of tasks in a user assessment.

Figure 8:
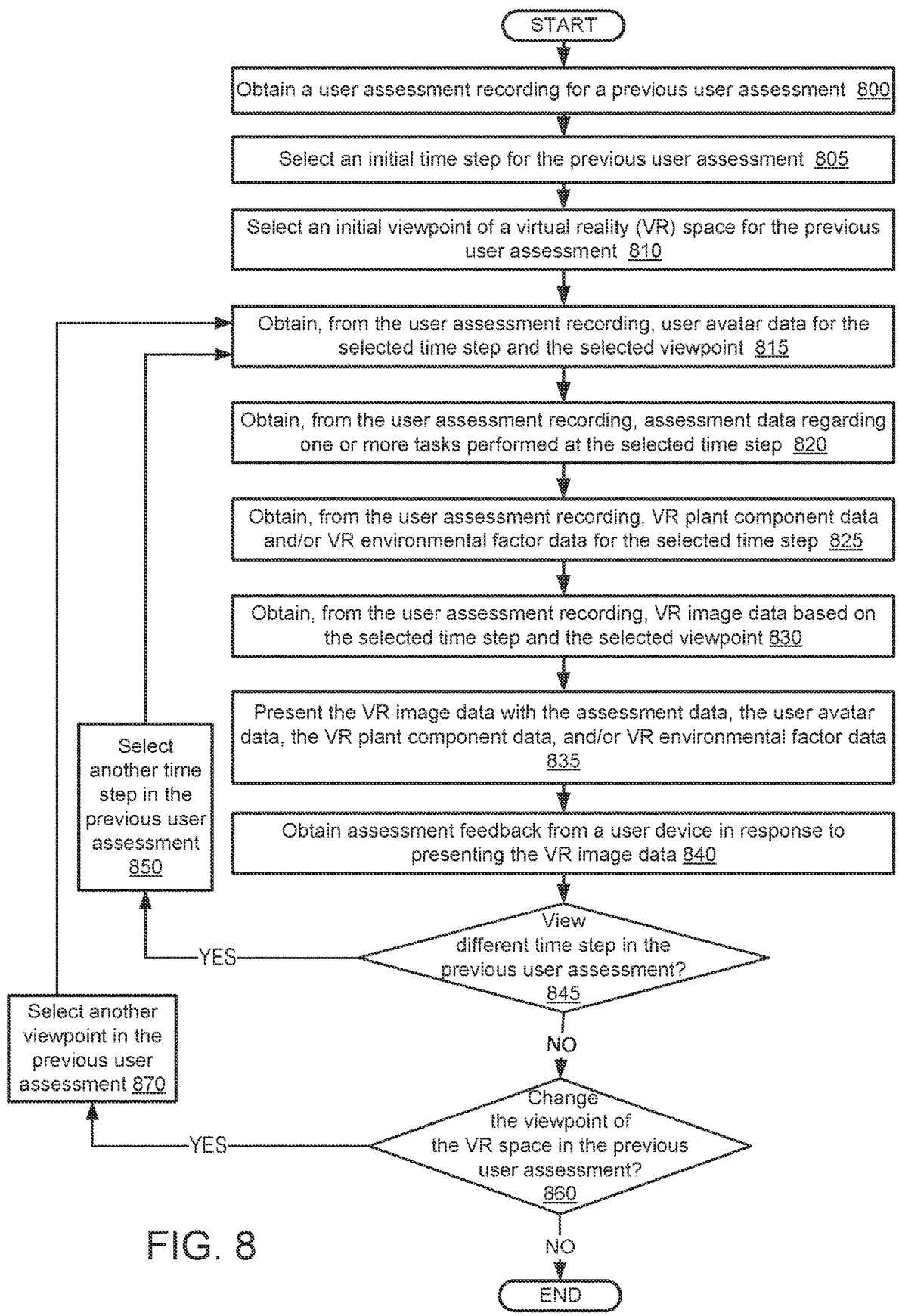

Turning to FIG. 8, FIG. 8 shows a flowchart in accordance with one or more embodiments. Specifically, FIG. 8 describes a specific method for reviewing and/or auditing a user assessment performed in a VR space. One or more blocks in FIG. 8 may be performed by one or more components (e.g., user assessment server X (150)) as described in FIGS. 1, 2A, 2B, 3, and 4. While the various blocks in FIG. 8 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 800, a user assessment recording is obtained for a previous assessment in accordance with one or more embodiments. In particular, a user device may use a user interface coupled to a database on a remote server (e.g., hosted by a user assessment manager or user assessment server) to access one or more files corresponding to a user assessment recording. The user assessment recording may be obtained for quality control purposes or an audit. For example, if a user is involved in a plant facility incident, past user assessments of the user may be reviewed to confirm whether the user was properly certified for the plant operations that resulted in the incident.

In some embodiments, for example, a user assessment recording may be generated following completion of one or more tasks in a VR space for a user assessment. The user assessment may include VR image data of VR components, VR environmental factors, and/or avatars present during the performance. Likewise, the user assessment recording may include various metadata associated with the user performing the user assessment, any observers of the user assessment (such as evaluators), assessment feedback, and description of tasks included in the user assessment. In some embodiments, the user assessment recording may be similar to the user assessment recording generated above in Block 545 in FIG. 5 and the accompanying description.

In Block 805, an initial time step is selected for a previous user assessment in accordance with one or more embodiments. For example, an evaluator or other interested party may select a particular VR scene within a user assessment recording for further analysis. A user may directly select the time with the desired VR scene. On the other hand, a user may select a particular task, and an auditing program may jump to the earliest time step associated with the task in the user assessment.

In Block 810, an initial viewpoint of a VR space is selected for a previous user assessment in accordance with one or more embodiments. For example, viewpoints may include a stereoscopic view through the headset of the test taker that performed the previous user assessment. Likewise, a viewpoint may include a mixed reality view based on VR image data producing in the user assessment along with an avatar replicating the physical motions of the test taker, e.g., using a camera device that recorded the test taker during the examination. In some embodiments, multiple camera devices are included at a user device performing the user assessment. Thus, each camera device may provide a different viewpoint of the test taker in a VR space during the user assessment.

In Block 815, user avatar data are obtained for a selected time step and a selected viewpoint from a user assessment recording in accordance with one or more embodiments.

In Block 820, assessment data are obtained regarding one or more task that are performed at a selected time step from a user assessment recording in accordance with one or more embodiments. In some embodiments, assessment data includes previous assessment feedback automatically generated by a user assessment manager or provided by a remote observer during the actual user assessment. On the other hand, the assessment data may provide descriptive information relating to the tasks being performed by a user at a particular time step. For examples, if a task relates to a static assessment, the assessment data may describe scoring possibilities for different options in view of a particular task. For tasks within a dynamic assessment, the assessment data may describe possible branching scenarios that were available to the user performing the assessment.

In Block 825, VR plant component data and/or VR environmental factor data are obtained for a selected time step from a user assessment recording in accordance with one or more embodiments. For example, VR plant component data may provide labels within a VR space of different VR plant components, e.g., to assist an auditor in following the user assessment. Likewise, VR environmental factor data may also provide labels and other information describing various environmental conditions within the VR present to the test taker.

In Block 830, VR image data are obtained based on a selected time step and a selected viewpoint from a user assessment recording in accordance with one or more embodiments.

In Block 835, VR image data are presented with assessment data, user avatar data, VR plant component data, and/or VR environmental factor data in accordance with one or more embodiments. For example, a VR space may be generated similar to the original VR space used for the previous user assessment. However, the new VR space may include the test taker as an avatar that is viewed in third person. In some embodiments, the VR image data are presented using a non-VR display device, such as on a computer monitor or other user device. In some embodiments, the VR image data are presented with information superimposed or overlayed on the VR images (e.g., user avatar data identifying the test taker, VR plant component data identifying relevant plant components, or VR environmental factor data identifying various environmental factors affecting the user assessment).

In Block 840, assessment feedback is obtained from a user device in response to presenting VR image data in accordance with one or more embodiments. Based on the presentation of the previous user assessment, a user may modify previous assessment feedback or provide additional feedback. For example, if a test taker failed the previous user assessment and appealed his grade, an auditor may update his score to a passing grade. As such, one or more user records may be updated accordingly, e.g., by noting in the test taker's employment records that he now possesses a desired certification.

In Block 845, a determination is made whether to view another time step in a previous user assessment in accordance with one or more embodiments. If it is determined that another time step should be viewed (e.g., to examiner the results of a different task), the process may proceed to Block 850. If it is determined to no change to the time step is desired, the process may proceed to Block 860.

In Block 850, another time step is selected in a previous user assessment in accordance with one or more embodiments.

In Block 860, a determination is made whether to change a viewpoint in a previous user assessment in accordance with one or more embodiments. For example, an auditor may decide to view a test taker's actions for a particular task from a different angle. If it is determined that a different viewpoint is desired, the process may proceed to Block 870. If it is determined to no change to the viewpoint is desired, the process may end.

In Block 870, another viewpoint is selected in a VR space for a previous user assessment in accordance with one or more embodiments.

In some embodiments, one or more user records are updated after auditing a user assessment recording. For example, the auditor may use an interface to transmit one or more commands to one or more servers to change a user's status of a particular certification that was audited. Likewise, previous user assessments may be reviewed based on user appeals, inquiries regarding user assessment scores, and other reasons.

Figure 9:
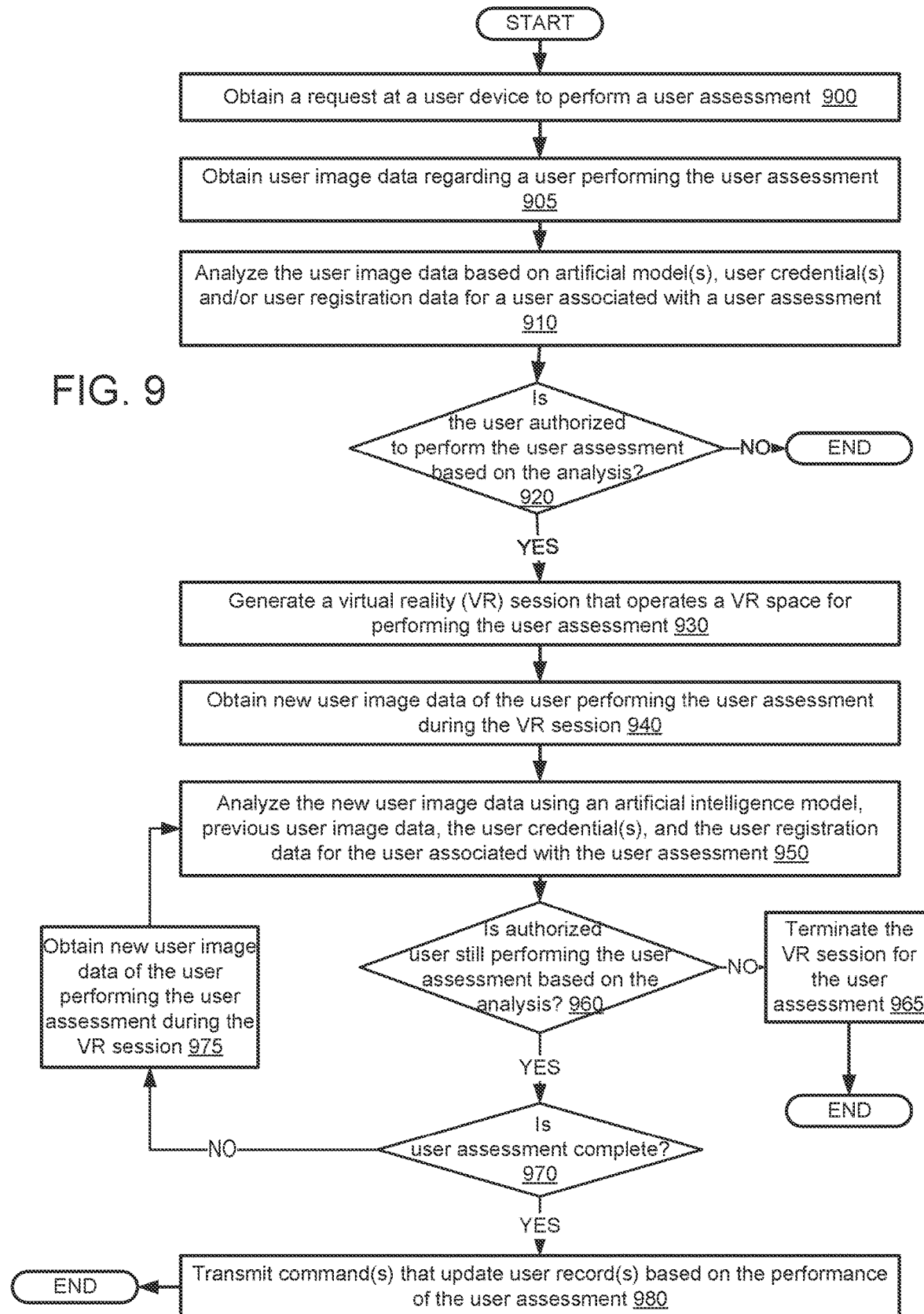

Turning to FIG. 9, FIG. 9 shows a flowchart in accordance with one or more embodiments. Specifically, FIG. 9 describes a specific method for determining whether an authorized user is still performing a user assessment in a VR session. One or more blocks in FIG. 9 may be performed by one or more components (e.g., user assessment manager A (169)) as described in FIGS. 1, 2A, 2B, 3, and 4. While the various blocks in FIG. 9 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 900, a request is obtained at a user device to perform a user assessment in accordance with one or more embodiments.

In Block 905, user image data are obtained regarding a user performing a user assessment in accordance with one or more embodiments. For example, a camera device coupled to a kiosk or other user device may acquire a picture of a test taker and a personal identification (ID) prior to beginning a user assessment.

In Block 910, user image data are analyzed based on one or more artificial intelligence models, one or more user credentials, and/or user registration data for a user associated with a user assessment in accordance with one or more embodiments. For example, a user assessment manager or a user assessment server may determine whether an expected user is being impersonated or an unauthorized person is attempting to perform a user assessment. As such, a user device may compare the physical test taker located at the user device with user credentials and/or user registration data that is available locally or on a remote server. In some embodiments, other biometric data are used in place of user image data or in addition to user image data to verify whether the correct person is performing a user assessment. For example, after being photographed by one or more camera devices, a user device may also analyze a voice sample or fingerprint of the test taker to confirm their identity.

In some embodiments, one or more artificial intelligence (AI) models are used to confirm a test taker's identity. For example, an AI model may be a machine-learning model that is trade to verify a user in a photo is the same as a user in available user credentials. More specifically, the AI model may be a deep neural network that obtains user credential data (e.g., the user's picture in a driver's license, the user's height or hair color, etc.) and user image data from one or more camera devices at the user device as input features to the deep neural network. Thus, one or more AI models may be used predict whether a test taker requesting to perform a user assessment is the same user identified in the user credentials or user registration data.

In Block 920, a determination is made whether a user is authorized to perform a user assessment based on an analysis in accordance with one or more embodiments. Using identity and biometric checks, a user requesting to perform a user assessment may be authenticated. In some embodiments, a user device may provide an automated system where test taker may initiate a user assessment while requiring no human support to start the examination process. If it is determined that a different user is requesting to perform a user assessment from information in user credentials or user registration data, the process may end. If it is determined that the same user is requesting to perform the user assessment from information in user credentials or user registration data, the process may proceed to Block 930.

In Block 930, a VR session is generated that operates a VR space for performing a user assessment in accordance with one or more embodiments. In a VR session, a user assessment manager may activate various VR devices, such as headsets, tracking sensors, and touch controllers that are used to perform a particular user assessment. Likewise, a user assessment manager may communicate with a user assessment server or other remote server to establish one or more connections to any observer devices, such as an evaluator device for an evaluator that will join the user assessment. Moreover, a VR session may also generate one or more VR spaces with respective VR components, VR environmental factors, and a VR environment for administering the user assessment.

In Block 940, new user image data are obtained of a user performing a user assessment during a VR session in accordance with one or more embodiments. For example, one or more camera devices may acquire pictures or video of a test taker at periodic intervals (e.g., every 15 seconds) during a user assessment. By verifying with previous data (e.g., user credentials, user registration data, previous user image data), a user assessment manager may confirm that a user has not replaced himself with another person to undertake the test. By having one or more anti-cheating algorithms being performed during the user assessment, the user assessment manager may provide a fully-automated assessment with no evaluator or other human assessor present at the user device.

In Block 950, new user image data are analyzed using one or more artificial intelligence models, previous user image data for a user, one or more user credentials, and/or user registration data for the user associated with the user assessment in accordance with one or more embodiments. In some embodiments, for example, the analysis of the new user image data is similar to the analysis in Block 910 above. In some embodiments, the new user image data are analyzed to confirm whether a test taker is receiving external assistance (e.g., from an electronic device, such as a smartphone or personal computer) during an assessment. Similar to confirming a user's identity, one or more artificial intelligence models may also analyze new user image data to determine whether a user is performing any actions that may identify a cheating operation.

In some embodiments, other user data are obtained and analyzed during a VR session, such as sound data. For example, a microphone in a headset or other device may record sounds occurring around a user device, e.g., to detect any external voice that may be provide assistance to a test taker. Similar to user image data, sound data may also be analyzed using one or more AI models.

In Block 960, a determination is made whether an authorized user is still performing a user assessment based on an analysis in accordance with one or more embodiments. Based on the analysis in Block 950, for example, a user assessment manager may determine that the original authorized user has been replaced by a different person to perform the user assessment. If it is determined that an authorized user is no longer performing the user assessment or is receiving outside assistance, the process may proceed to Block 965. If it is determined that an authorized user is still performing a user assessment, the process may proceed to Block 970.

In Block 965, a VR session is terminated for a user assessment in accordance with one or more embodiments. For example, if a user assessment manager determines that a test taker is cheating or committing plagiarism, the user assessment manager may stop the VR session. Likewise, a message may be transmitted regarding the user assessment that cheating or other outside assistance was detected.

In Block 970, a determination is made whether a user assessment is complete in accordance with one or more embodiments. If it is determined that the user assessment is not finished, the process may proceed to Block 975. If it is determined that the user assessment is finished, the process may proceed to Block 980.

In Block 975, new user image data are obtained of a user performing a user assessment during a VR session in accordance with one or more embodiments. For example, a test taker may be iteratively monitored through a VR session to determine whether a user assessment was properly performed.

In Block 980, one or more commands are transmitted that update one or more user records based on a performance of a user assessment in accordance with one or more embodiments.

Figure 10:
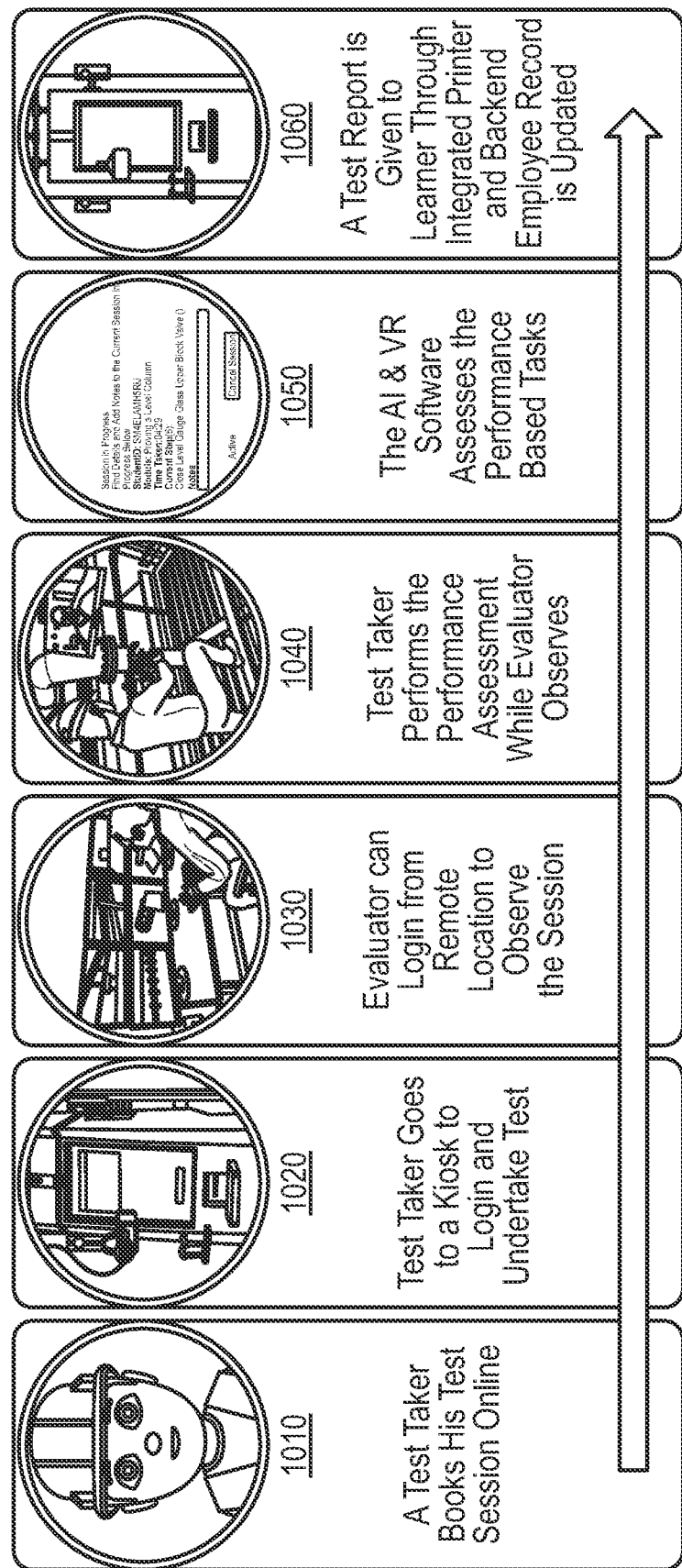
FIG. 10 shows an example in accordance with one or more embodiments.

Turning to FIG. 10, FIG. 10 illustrates an example in accordance with one or more embodiments. In FIG. 10, a test taker registers for a test session online in Block 1010. After registration, the test taker visits a kiosk at a scheduled time to undertake the scheduled test in Block 1020. Next in Block 1030, an evaluator may login from a remote location into the kiosk to observe the test session in a virtual reality environment. In Block 1040, the test taker may then perform a performance assessment while an evaluator observes the test taker in the virtual reality environment. During this performance session in Block 1050, artificial intelligence and virtual reality software assesses various performance-based tasks. After completing the performance assessment, a test report may be provided to the test taker through an integrated printer in Block 1060. Likewise, an employee record may be updated in the backend by the kiosk administering the performance-based assessment.

Figure 11:
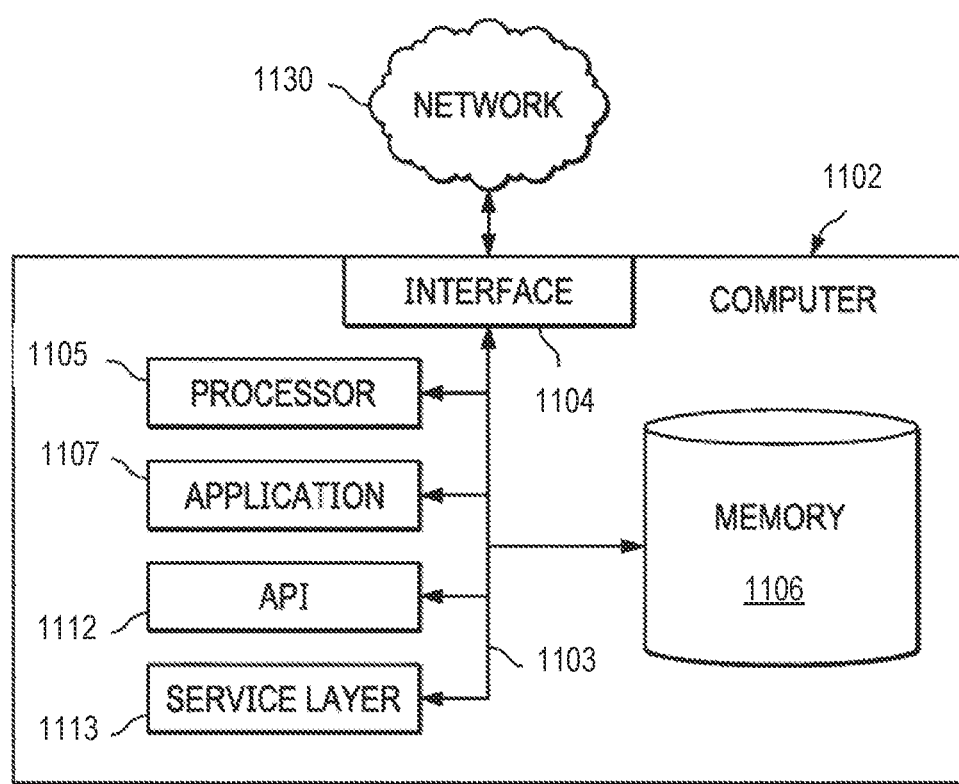
FIG. 11 shows a computer system in accordance with one or more embodiments.

Embodiments may be implemented on a computer system. FIG. 11 is a block diagram of a computer system (1102) used to provide computational functionalities associated with described algorithms, methods, functions, processes, flows, and procedures as described in the instant disclosure, according to an implementation. The illustrated computer (1102) is intended to encompass any computing device such as a high performance computing (HPC) device, server, desktop computer, laptop/notebook computer, wireless data port, smart phone, personal data assistant (PDA), tablet computing device, one or more computer processors within these devices, or any other suitable processing device, including both physical or virtual instances (or both) of the computing device. Additionally, the computer (1102) may include a computer that includes an input device, such as a keypad, keyboard, touch screen, or other device that can accept user information, and an output device that conveys information associated with the operation of the computer (1102), including digital data, visual, or audio information (or a combination of information), or a GUI.

The computer (1102) can serve in a role as a client, network component, a server, a database or other persistency, or any other component (or a combination of roles) of a computer system for performing the subject matter described in the instant disclosure. The illustrated computer (1102) is communicably coupled with a network (1130). In some implementations, one or more components of the computer (1102) may be configured to operate within environments, including cloud-computing-based, local, global, or other environment (or a combination of environments).

At a high level, the computer (1102) is an electronic computing device operable to receive, transmit, process, store, or manage data and information associated with the described subject matter. According to some implementations, the computer (1102) may also include or be communicably coupled with an application server, e-mail server, web server, caching server, streaming data server, business intelligence (BI) server, or other server (or a combination of servers).

The computer (1102) can receive requests over network (1130) from a client application (for example, executing on another computer (1102)) and responding to the received requests by processing the said requests in an appropriate software application. In addition, requests may also be sent to the computer (1102) from internal users (for example, from a command console or by other appropriate access method), external or third-parties, other automated applications, as well as any other appropriate entities, individuals, systems, or computers.

Each of the components of the computer (1102) can communicate using a system bus (1103). In some implementations, any or all of the components of the computer (1102), both hardware or software (or a combination of hardware and software), may interface with each other or the interface (1104) (or a combination of both) over the system bus (1103) using an application programming interface (API) (1112) or a service layer (1113) (or a combination of the API (1112) and service layer (1113). The API (1112) may include specifications for routines, data structures, and object classes. The API (1112) may be either computer-language independent or dependent and refer to a complete interface, a single function, or even a set of APIs. The service layer (1113) provides software services to the computer (1102) or other components (whether or not illustrated) that are communicably coupled to the computer (1102). The functionality of the computer (1102) may be accessible for all service consumers using this service layer. Software services, such as those provided by the service layer (1113), provide reusable, defined business functionalities through a defined interface. For example, the interface may be software written in JAVA, C++, or other suitable language providing data in extensible markup language (XML) format or other suitable format. While illustrated as an integrated component of the computer (1102), alternative implementations may illustrate the API (1112) or the service layer (1113) as stand-alone components in relation to other components of the computer (1102) or other components (whether or not illustrated) that are communicably coupled to the computer (1102). Moreover, any or all parts of the API (1112) or the service layer (1113) may be implemented as child or sub-modules of another software module, enterprise application, or hardware module without departing from the scope of this disclosure.

The computer (1102) includes an interface (1104). Although illustrated as a single interface (1104) in FIG. 11, two or more interfaces (1104) may be used according to particular needs, desires, or particular implementations of the computer (1102). The interface (1104) is used by the computer (1102) for communicating with other systems in a distributed environment that are connected to the network (1130). Generally, the interface (1104 includes logic encoded in software or hardware (or a combination of software and hardware) and operable to communicate with the network (1130). More specifically, the interface (1104) may include software supporting one or more communication protocols associated with communications such that the network (1130) or interface's hardware is operable to communicate physical signals within and outside of the illustrated computer (1102).

The computer (1102) includes at least one computer processor (1105). Although illustrated as a single processor (1105) in FIG. 11, two or more computer processors may be used according to particular needs, desires, or particular implementations of the computer (1102). Generally, the computer processor (1105) executes instructions and manipulates data to perform the operations of the computer (1102) and any algorithms, methods, functions, processes, flows, and procedures as described in the instant disclosure.

The computer (1102) also includes a memory (1106) that holds data for the computer (1102) or other components (or a combination of both) that can be connected to the network (1130). For example, memory (1106) can be a database storing data consistent with this disclosure. Although illustrated as a single memory (1106) in FIG. 11, two or more memories may be used according to particular needs, desires, or particular implementations of the computer (1102) and the described functionality. While memory (1106) is illustrated as an integral component of the computer (1102), in alternative implementations, memory (1106) can be external to the computer (1102).

The application (1107) is an algorithmic software engine providing functionality according to particular needs, desires, or particular implementations of the computer (1102), particularly with respect to functionality described in this disclosure. For example, application (1107) can serve as one or more components, modules, applications, etc. Further, although illustrated as a single application (1107), the application (1107) may be implemented as multiple applications (1107) on the computer (1102). In addition, although illustrated as integral to the computer (1102), in alternative implementations, the application (1107) can be external to the computer (1102).

There may be any number of computers (1102) associated with, or external to, a computer system containing computer (1102), each computer (1102) communicating over network (1130). Further, the term "client," "user," and other appropriate terminology may be used interchangeably as appropriate without departing from the scope of this disclosure. Moreover, this disclosure contemplates that many users may use one computer (1102), or that one user may use multiple computers (1102).

In some embodiments, the computer (11102) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
   obtaining, by a first user device of an auditor user, a first user assessment recording that is a mixed-reality recording of a completed first user assessment,
       wherein the auditor user is a reviewer of the first user assessment recording,
       wherein the completed first user assessment is a user assessment that was previously performed and completed by a test taker user who was a test taker performing a task, and
       wherein the first user assessment recording comprises:
           at least one virtual reality (VR) space that is a VR environment corresponding to a testing environment;
           VR image data; and
           a test taker avatar of the test taker user;
   obtaining, by the first user device, a selection of a first time step for the first user assessment recording;
   obtaining, by the first user device, a first viewpoint provided by a first camera device, wherein the first viewpoint is a selection from a plurality of viewpoints, wherein each of the plurality of viewpoints is provided by a different camera device and corresponds to a different view of the test taker avatar in the at least one VR space during a real time performance of the completed first user assessment;
   obtaining, by the first user device, first VR image data based on the first time step and the first viewpoint from the first user assessment recording;
   presenting, by the first user device to the auditor user, a first VR space from the at least one VR space of the completed first user assessment based on the first viewpoint, the first time step and the first VR image data;
   obtaining, by the first user device, a second viewpoint in the first VR space provided by a second camera device different from the first camera device, wherein the second viewpoint is selected from the plurality of viewpoints;
   obtaining, by the first user device, second VR image data based on the first time step and the second viewpoint;

presenting, by the first user device to the auditor user, the first VR space of the completed first user assessment based on the second viewpoint, the first time step, and the second VR image data;

switching, by the first user device, the presenting of the first user assessment recording between the first viewpoint and the second viewpoint in response to a selection by the auditor user; and transmitting, by the first user device, a command that updates one or more user records of the test taker user in response to presenting the first VR space to the auditor user, wherein transmitting the command comprises sending a performance grade of the test taker user performing the task, wherein updating the one or more user records comprises adding the performance grade to an employer database with respect to the test taker user, wherein the first user assessment recording is generated by a second user device of the test taker user during the real time performance of the completed first user assessment, and wherein the performance grade of the test taker user performing the task is sent to the employer database with respect to the test taker user by the first user device of the auditor user, separate from the second user device of the test taker user.

2. The method of claim 1, further comprising:
determining the task for the completed first user assessment associated with the first time step; and
obtaining VR plant component data and VR environmental factor data regarding the task,
wherein the first VR space is presented with the VR plant component data and the VR environmental factor data overlaying one or more VR plant components disposed in the first VR space.

3. The method of claim 1, further comprising:
obtaining, by the first user device, a selection of a second time step for the first user assessment recording;
obtaining, by the first user device, third VR image data based on the second time step and a selected viewpoint among the plurality of viewpoints; and
presenting, by the first user device to the auditor user, a second VR space from the at least one VR space of the completed first user assessment based on the selected viewpoint, the second time step, and the third VR image data,
wherein the second time step is different from the first time step.

4. The method of claim 1, further comprising:
determining the task for the completed first user assessment associated with the first time step;
obtaining first assessment feedback for the task, wherein the first assessment feedback corresponds to one or more messages from an evaluator device in response to the real time performance of the test taker user in the completed first user assessment, and
wherein the first assessment feedback is a scoring of the test taker user in the completed first user assessment with respect to touch inputs, verbal responses, and nonverbal cues based on the test taker avatar in the first VR image data and the second VR image data; and
updating the first assessment feedback to produce updated assessment feedback in response to presenting the first VR space to the auditor user, based on the first user assessment recording, wherein the performance grade comprises the updated assessment feedback.

5. The method of claim 1, further comprising:
obtaining, by the first user device, a third viewpoint in the first VR space of the first user assessment recording, the third viewpoint provided by a third camera device different from the first camera device and the second camera device,
wherein the first user assessment recording further comprises an evaluator user avatar of an evaluator user that is an observer of the test taker user during the real time performance of the completed first user assessment, and
wherein the third viewpoint corresponds to a stereoscopic vision of the evaluator user based on the evaluator user avatar;
obtaining, by the first user device, third VR image data based on the first time step and the third viewpoint,
wherein the third VR image data corresponds to interactions of the evaluator user within the first VR space;
wherein the first user assessment recording is configured to switch between the first viewpoint, the second viewpoint, and the third viewpoint in response to a selection by the auditor user,
wherein an evaluator performance of the evaluator user is scored in the completed first user assessment with respect to touch inputs, verbal responses, and nonverbal cues based on the evaluator user avatar in the third VR image data,
wherein the evaluator performance comprises one or more real time communications with the test taker user, first assessment feedback of the test taker user, and one or more user assessment adjustments; and
transmitting, by the first user device, a command that updates one or more evaluator records of the evaluator user in response to presenting the first VR space to the auditor user,
wherein transmitting the command comprises sending a performance score of the evaluator user, and
wherein updating the one or more evaluator records comprises adding the performance score to an evaluator database with respect to the evaluator user.

6. The method of claim 1, further comprising:
presenting, using a user interface coupled to a server, a plurality of user assessment recordings on a user device;
obtaining, from the user device, a selection of a second user assessment recording among the plurality of user assessment recordings; and
generating a second VR space based on the second user assessment recording.

7. A system, comprising:
a first user device of an auditor user and comprising a computer processor and a display;
a second user device of a test taker user and comprising a touch controller, a tracking sensor, and a plurality of camera devices; and
a server coupled to the first user device and the second user device,
wherein the first user device is configured to:
obtain, from the server, a user assessment recording that is a mixed-reality recording of a completed user assessment of a task that was previously performed by the test taker user,
wherein the auditor user is a reviewer of the user assessment recording, and wherein the user assessment recording comprises:
  at least one virtual reality (VR) space that is a VR environment corresponding to a testing environment;
  VR image data; and
  a test taker avatar of the test taker user;
obtain a selection of a first time step for the user assessment recording;
obtain a first viewpoint provided by a first camera device selected among the plurality of camera devices, wherein the first viewpoint is a selection from a plurality of viewpoints, wherein each of the plurality of viewpoints is provided by a different camera device and corresponds to a different view of the test taker avatar in the at least one VR space during a real time performance of the completed user assessment;
obtain first VR image data based on the first time step and the first viewpoint from the user assessment recording;
present, using the display to the auditor user, a first VR space from the at least one VR space of the completed user assessment based on the first viewpoint, the first time step and the first VR image data;
obtain a second viewpoint in the first VR space provided by a second camera device among the plurality of camera devices that is different from the first camera device, wherein the second viewpoint is selected from the plurality of viewpoints;
obtain second VR image data based on the first time step and the second viewpoint;
present, using the display to the auditor user, the first VR space of the completed user assessment based on the second viewpoint, the first time step, and the second VR image data;
switch the presenting of the user assessment recording between the first viewpoint and the second viewpoint in response to a selection by the auditor user; and
transmit a command that updates one or more user records of the test taker user in response to presenting the first VR space to the auditor user,
  wherein transmitting the command comprises sending a performance grade of the test taker user performing the task, and
  wherein updating the one or more user records comprises adding the performance grade to an employer database with respect to the test taker user,
wherein the second user device generates the user assessment recording based on one or more user inputs from the touch controller of the test taker user during the real time performance of the completed user assessment, and
wherein the first user device of the auditor user, separate from the second user device of the test taker user, sends the performance grade of the test taker user performing the task to the employer database with respect to the test taker user.

8. The system of claim 7,
wherein the second user device comprises a plurality of pods comprising a first pod and a second pod, and
wherein the second user device comprises a user assessment manager configured to perform a plurality of user assessments simultaneously using the plurality of pods.

9. The system of claim 7, wherein the first user device is further configured to:
determine the task for the completed user assessment associated with the first time step; and
obtain VR plant component data and VR environmental factor data regarding the task,
wherein the first VR space is presented with the VR plant component data and the VR environmental factor data overlaying one or more VR plant components disposed in the first VR space.

10. The system of claim 7, wherein the first user device is further configured to:
obtain a third viewpoint in the first VR space of the user assessment recording, the third viewpoint provided by a third camera device different from the first camera device and the second camera device,
  wherein the user assessment recording further comprises an evaluator user avatar of an evaluator user that is an observer of the test taker user during the real time performance of the completed user assessment, and
  wherein the third viewpoint corresponds to a stereoscopic vision of the evaluator user based on the evaluator user avatar;
obtain third VR image data based on the first time step and the third viewpoint,
  wherein the third VR image data corresponds to interactions of the evaluator user within the first VR space;
wherein the user assessment recording is configured to switch between the first viewpoint, the second viewpoint, and the third viewpoint in response to a selection by the auditor user,
wherein an evaluator performance of the evaluator user is scored in the completed user assessment with respect to touch inputs, verbal responses, and nonverbal cues based on the evaluator user avatar in the third VR image data,
  wherein the evaluator performance comprises one or more real time communications with the test taker user, first assessment feedback of the test taker user, and one or more user assessment adjustments; and
transmit a command that updates one or more evaluator records of the evaluator user in response to presenting the first VR space to the auditor user,
  wherein transmitting the command comprises sending a performance score of the evaluator user, and
  wherein updating the one or more evaluator records comprises adding the performance score to an evaluator database with respect to the evaluator user.

* * * * *